(12) United States Patent
Shikanai

(10) Patent No.: US 8,334,492 B2
(45) Date of Patent: Dec. 18, 2012

(54) SOLID-STATE IMAGING DEVICE, IMAGING DEVICE, AND SEMICONDUCTOR DEVICE

(75) Inventor: Takeshi Shikanai, Kanagawa (JP)

(73) Assignee: Sony Corporation (JP)

( * ) Notice: Subject to any disclaimer, the term of this patent is extended or adjusted under 35 U.S.C. 154(b) by 438 days.

(21) Appl. No.: 12/658,844

(22) Filed: Feb. 16, 2010

(65) Prior Publication Data

US 2010/0213350 A1 Aug. 26, 2010

(30) Foreign Application Priority Data

Feb. 25, 2009 (JP) ................. P2009-041752

(51) Int. Cl.
*H01L 27/146* (2006.01)
(52) U.S. Cl. .................. 250/208.1; 250/214.1
(58) Field of Classification Search ............... 250/208.1, 250/214.1; 348/297, 302
See application file for complete search history.

(56) References Cited

U.S. PATENT DOCUMENTS

| 7,321,329 | B2 * | 1/2008 | Tooyama et al. ............. 341/163 |
| 7,324,033 | B2 * | 1/2008 | Asayama et al. ............. 341/145 |
| 7,375,672 | B2 * | 5/2008 | Muramatsu et al. .......... 341/164 |
| 7,623,173 | B2 | 11/2009 | Nitta et al. |
| 2009/0190021 | A1 | 7/2009 | Nitta et al. |

FOREIGN PATENT DOCUMENTS

| JP | 2002-165134 A | 6/2002 |
| JP | 2005-278135 A | 10/2005 |

* cited by examiner

*Primary Examiner* — Tony Ko
(74) *Attorney, Agent, or Firm* — Lerner, David, Littenberg, Krumholz & Mentlik, LLP

(57) ABSTRACT

A solid-state imaging device includes: a pixel array unit; a vertical scan unit reading out analog pixel signals from the pixel array unit; an AD conversion unit provided each column for converting the analog pixel signals read out from the pixel array unit into digital data; a data memory unit having a data holding circuit that holds the digital data; a transfer driving unit driving a signal line for data transfer based on data of the data holding circuit; a signal amplification unit receiving the data of the data holding circuit and performs signal amplification; a potential fixing unit fixing an input terminal and/or internal wiring of the signal amplification unit to a predetermined potential; a drive power supply unit on/off-controlling power supply; a scan unit controlling the transfer driving unit to transfer the data to the signal amplification unit; and a drive control unit controlling entire operation.

12 Claims, 18 Drawing Sheets

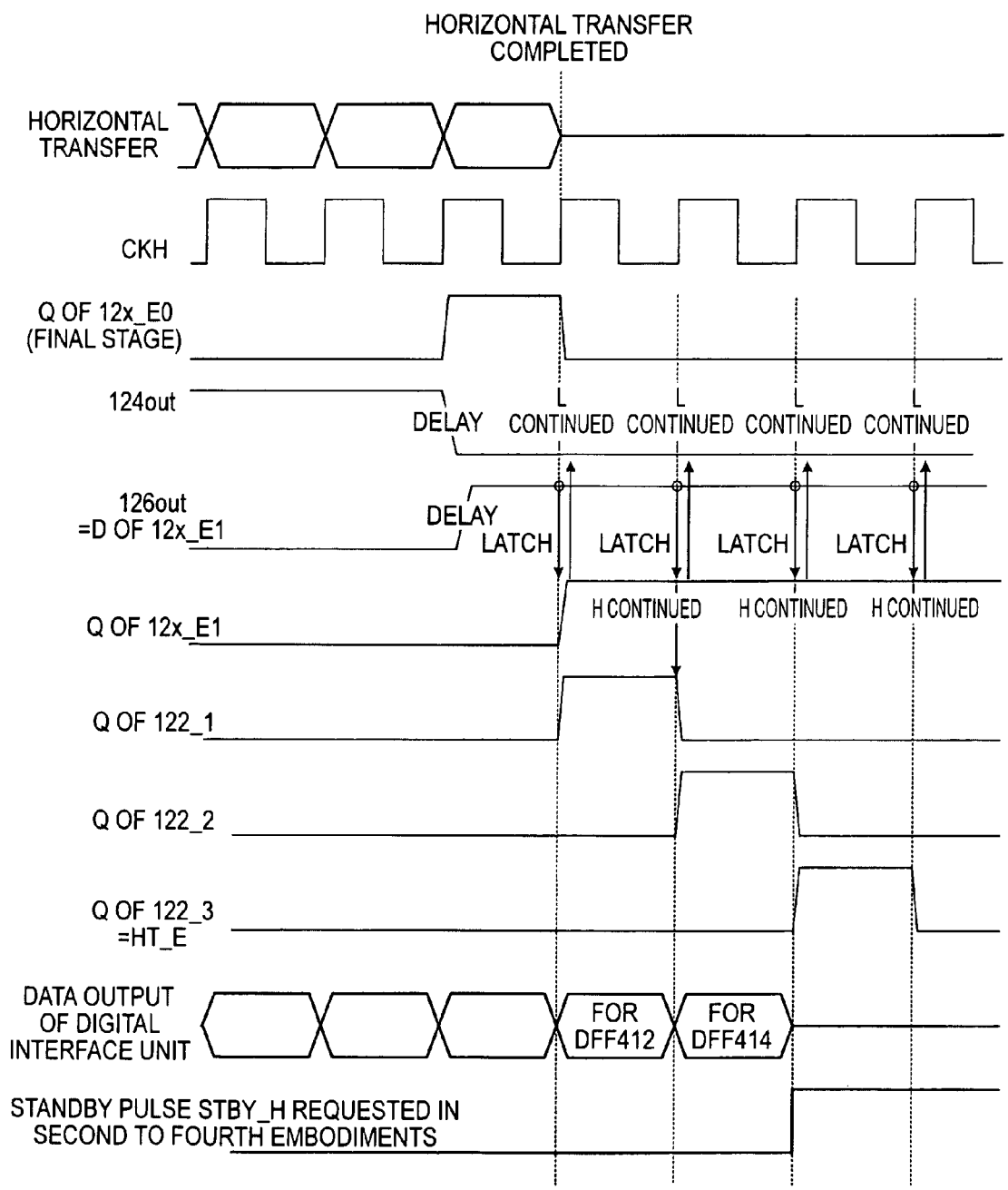

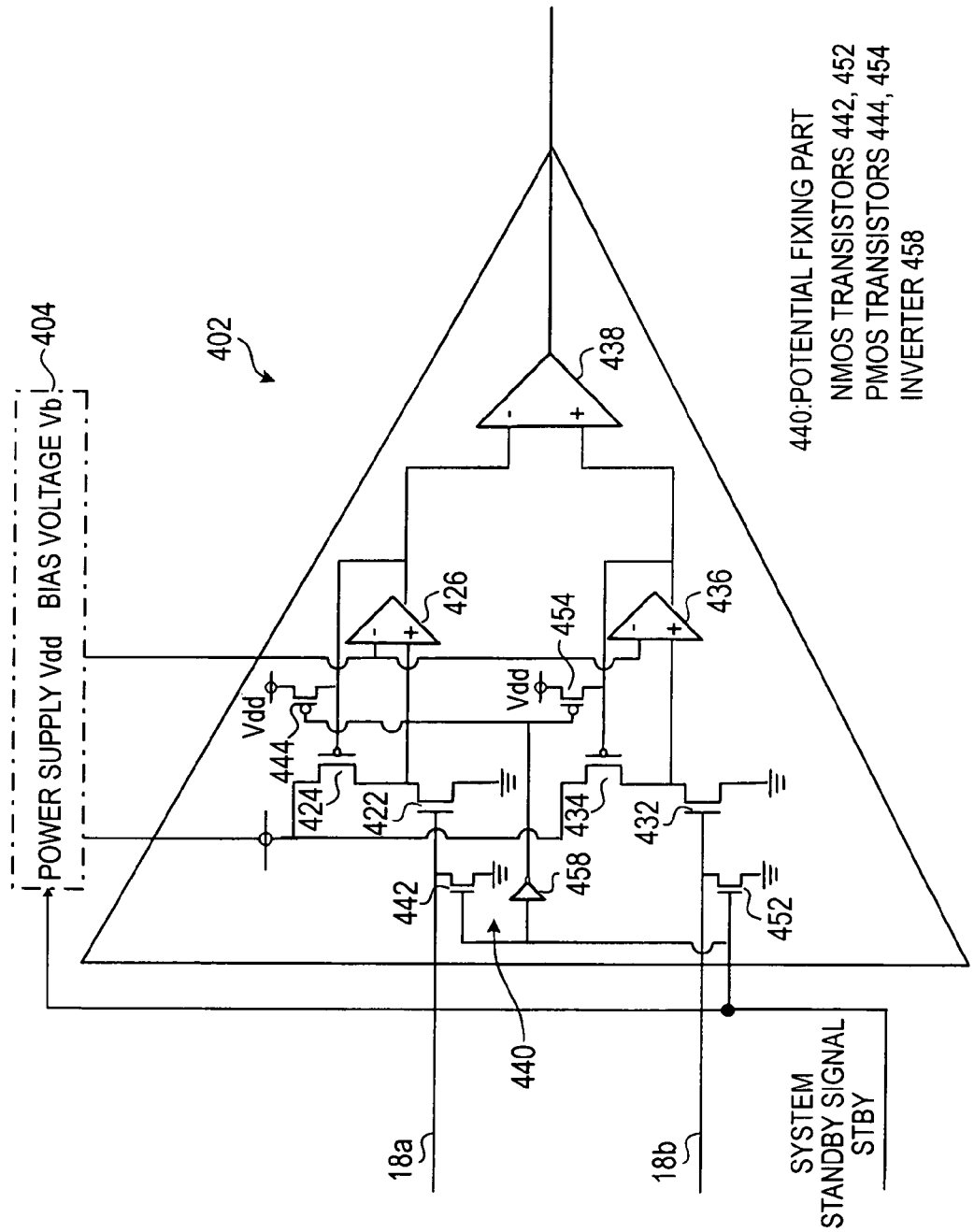

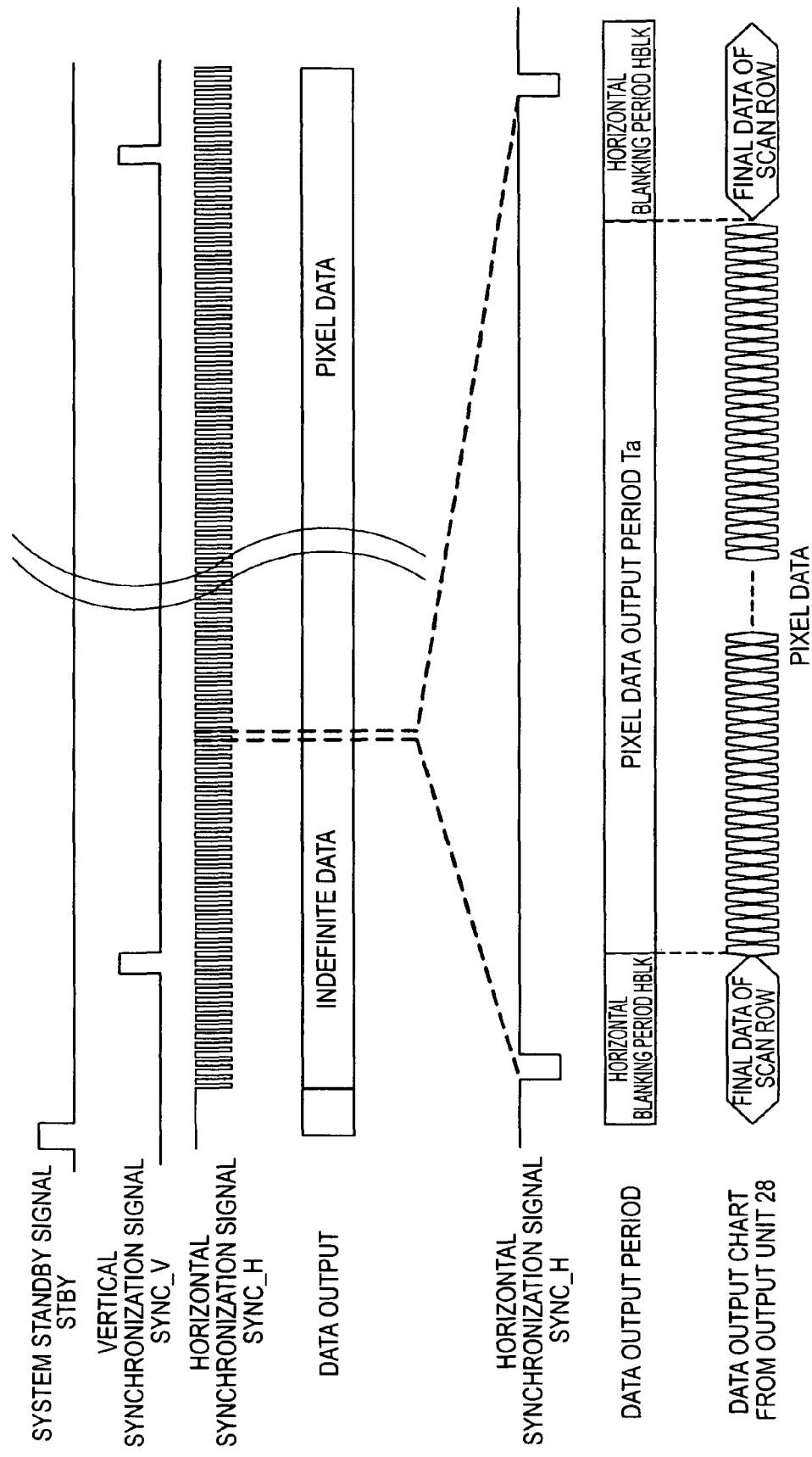

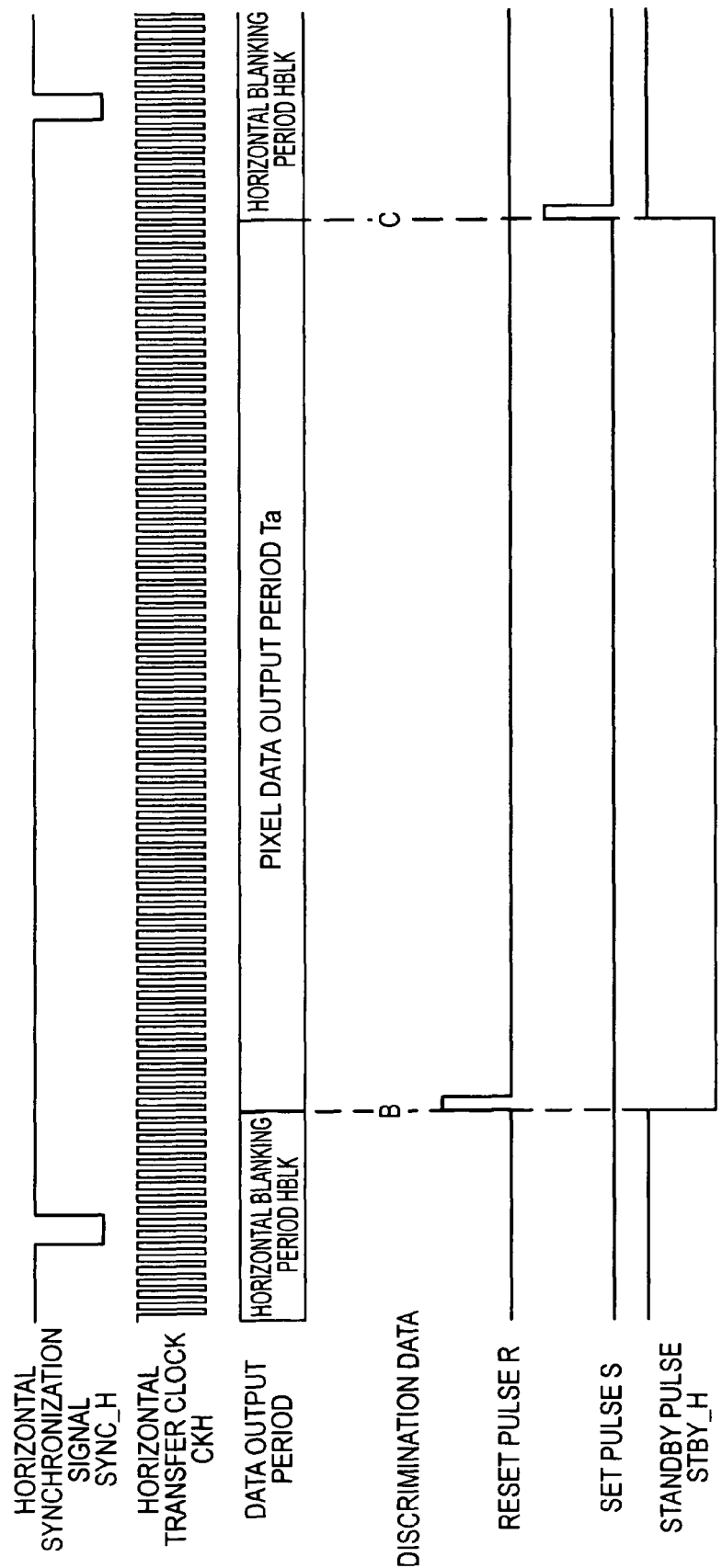

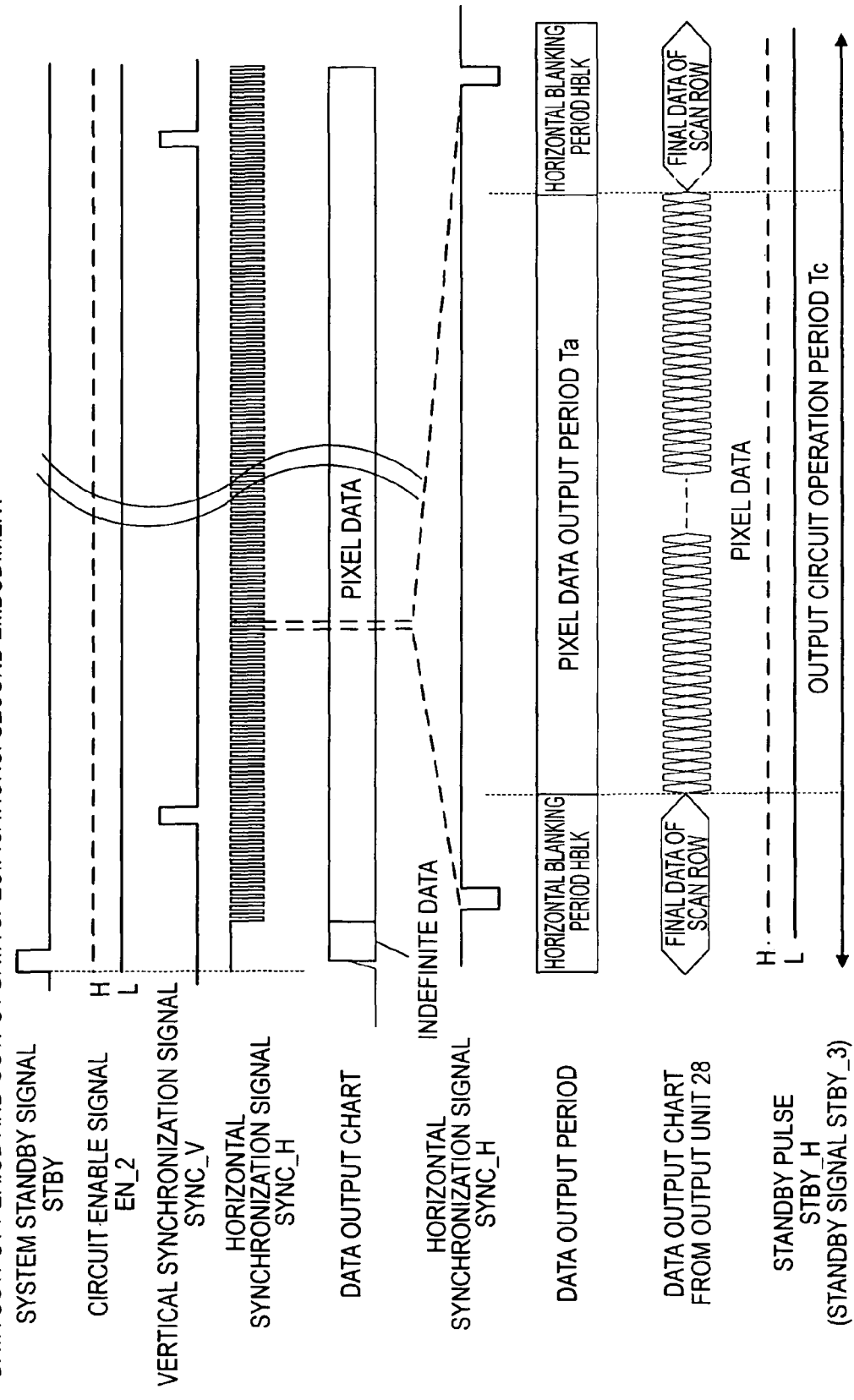

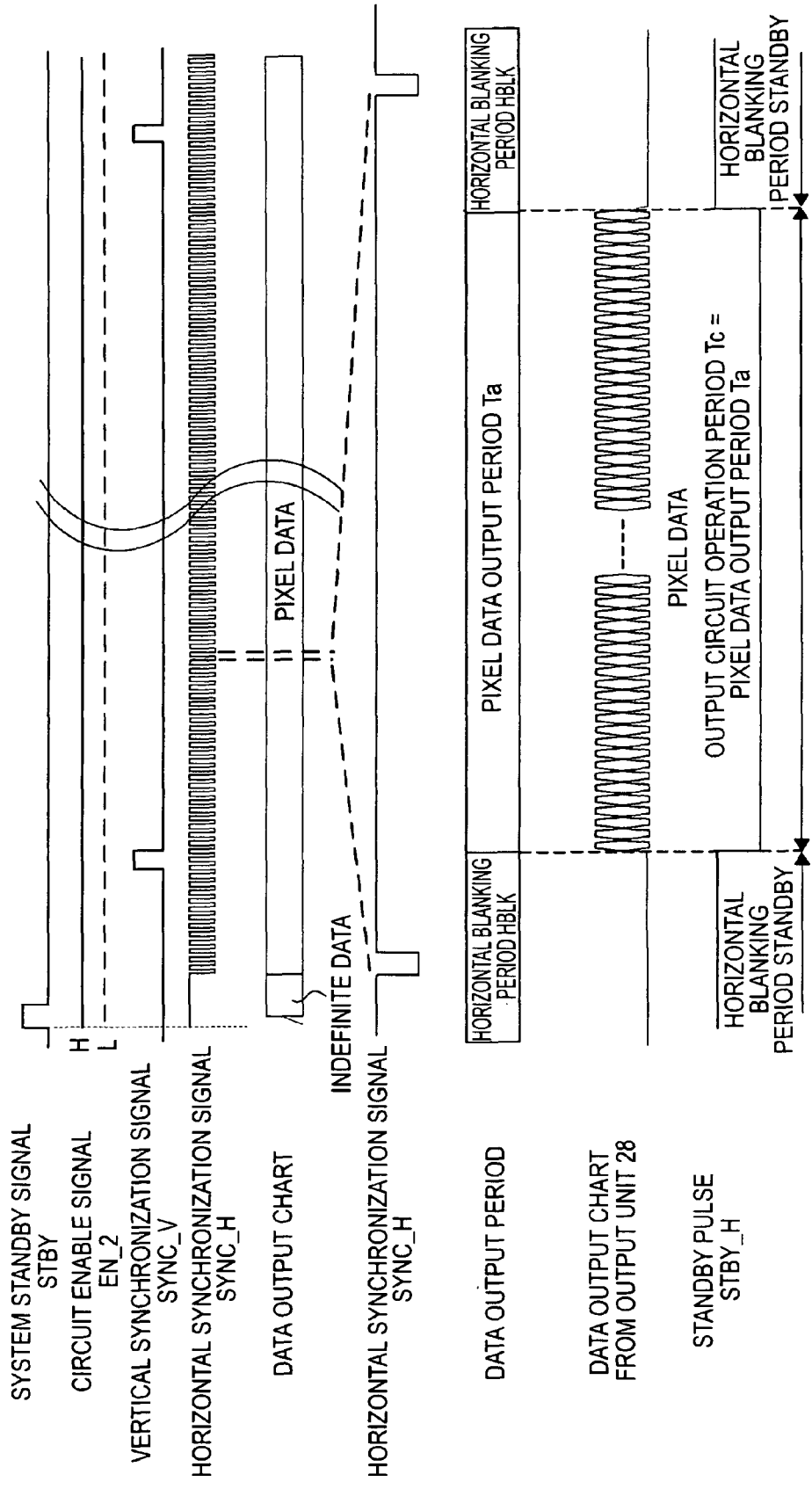

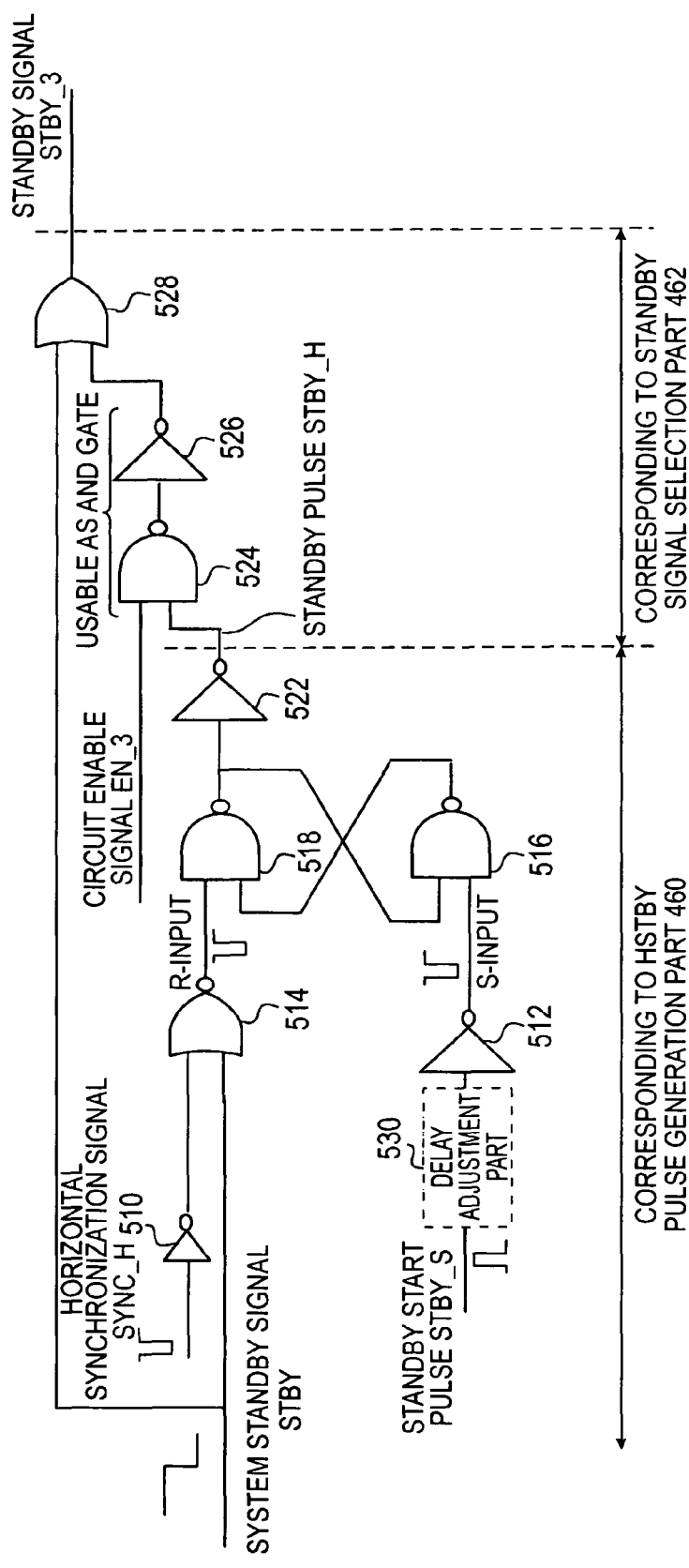

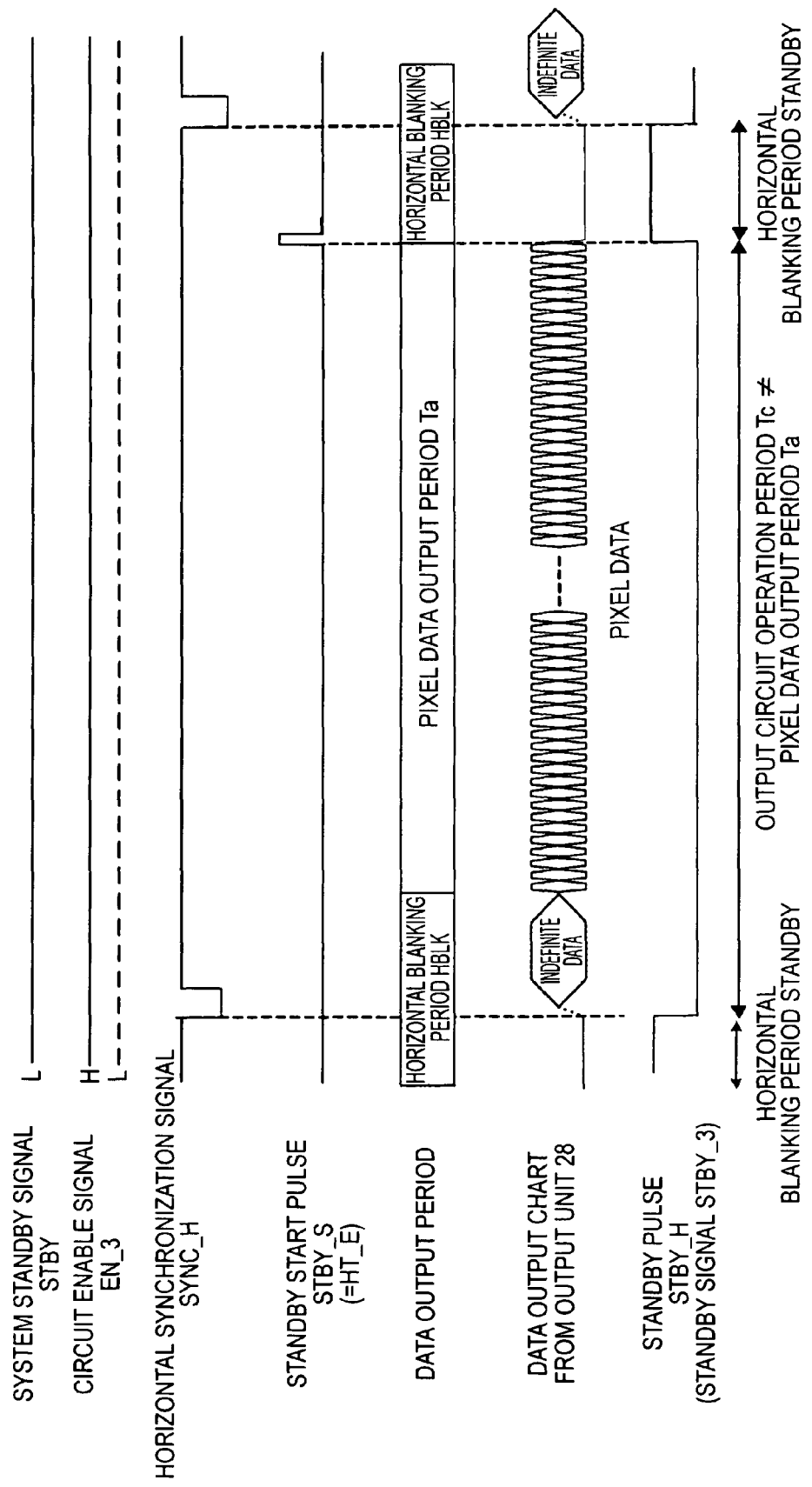

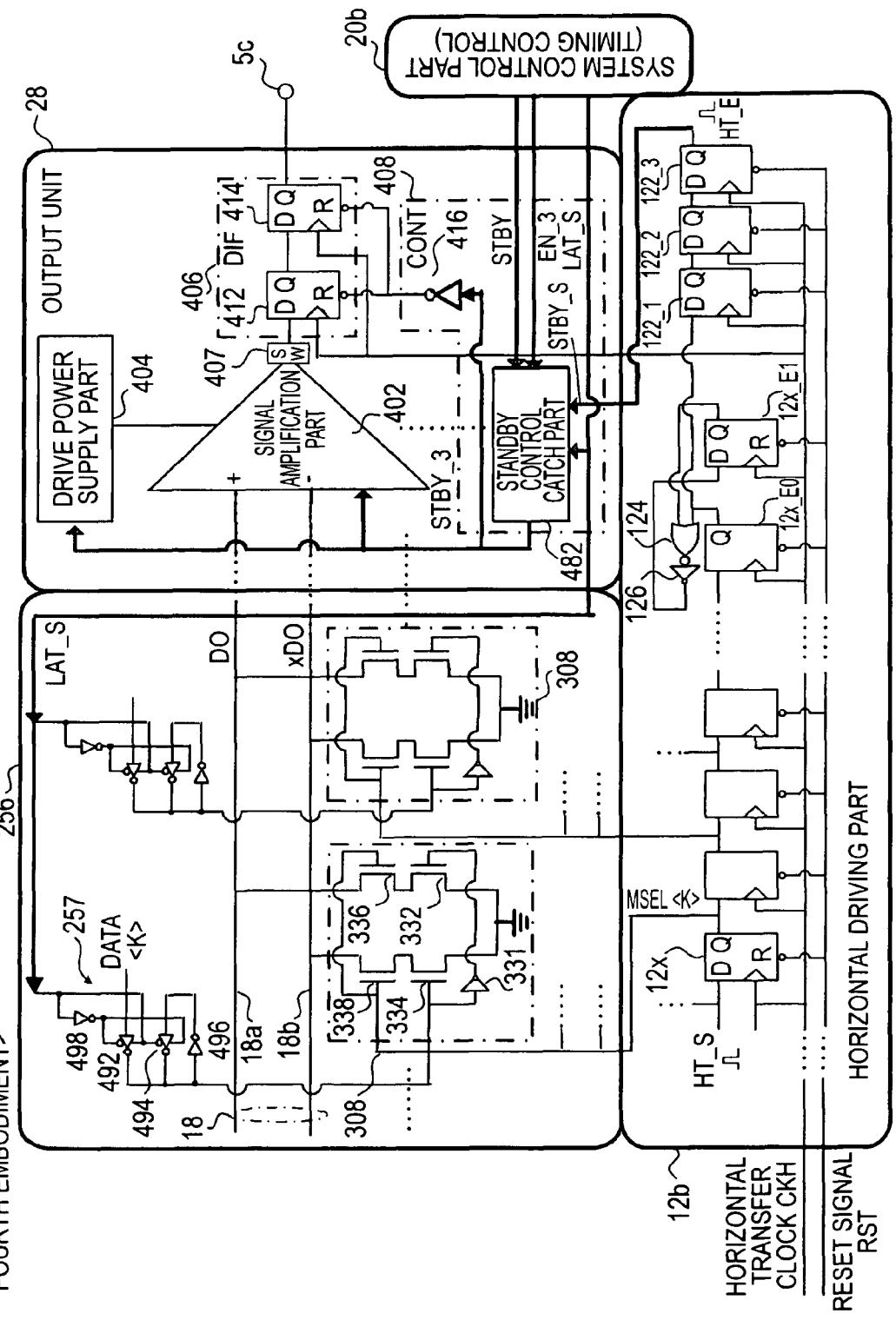

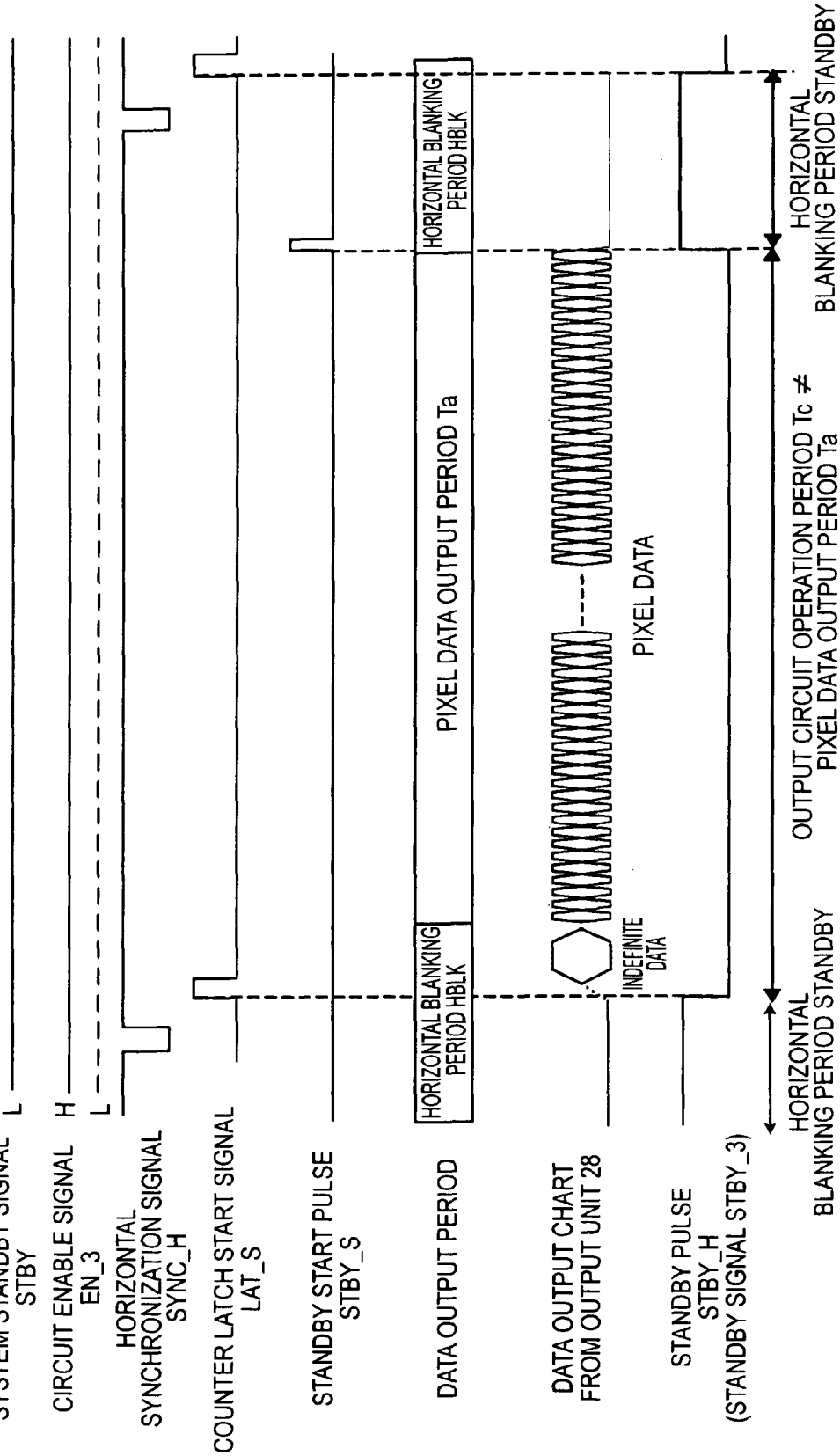

SOLID-STATE IMAGING DEVICE, IMAGING DEVICE, AND SEMICONDUCTOR DEVICE

CROSS-REFERENCE TO RELATED APPLICATION

The present application claims priority from Japanese Patent Application No. JP JP 2009-041752 filed in the Japanese Patent Office on Feb. 25, 2009, the entire content of which is incorporated herein by reference.

BACKGROUND OF THE INVENTION

1. Field of the Invention

The present invention relates to a solid-state imaging device, an imaging device, and a semiconductor device.

2. Background Art

In various electronic devices and semiconductor devices such as image processing devices, imaging devices, and solid-state imaging devices, an output circuit that selects one of the respective signals of plural routes and sequentially transfers and outputs signals to a downstream circuit via one route of output lines may be used.

For example, a physical quantity distribution sensing semiconductor device formed by arranging unit component elements (e.g., pixels) having sensitivity to externally input electromagnetic wave such as light or radiation linearly or in a matrix are used in various fields.

For instance, in the field of video devices, solid-state imaging devices of CCD (Charge Coupled Device) type, MOS (Metal Oxide Semiconductor) or CMOS (Complementary Metal-oxide Semiconductor)-type for sensing light (an example of electromagnetic wave) of physical quantities are used. These devices read out the physical quantity distribution converted into electric signals by the unit component elements (pixels in the solid-state imaging devices) as electric signals. The MOS-type and the CMOS-type are representatively described by the CMOS-type as below.

Further, among the solid-state imaging devices, there is an amplification solid-state imaging device including pixels having an active pixel sensor (APS, also called a gain cell) configuration with drive transistors for amplification in pixel signal generating units that generate pixel signals according to signal charge generated in charge generating units. For example, many of the CMOS-type solid-state imaging devices have such a configuration.

For example, a CCD-type solid-state imaging device is proposed in JP-A-2002-165134, and a CMOS-type solid-state imaging device is proposed in JP-A-2005-278135. In JP-A-2005-278135, a configuration including column parallel ADC formed by providing analog-digital converters (hereinafter, abbreviated as ADC) with respect to each column in the matrix arrangement of unit pixels is shown.

In order to externally output the pixel signals acquired by the solid-state imaging device, an output circuit that transfers and outputs signals of the respective pixels (pixel signals and pixel data) forming imaging signals (imaging data in digital cases) is mounted on the solid-state imaging device as an interface circuit to an external circuit.

Recently, with higher definition of shot images, the number of pixels and the drive frequency have tended to increase and the transfer speed in the output circuit have become higher, and accordingly, power consumption in the output circuit has become problematic and measures therefor has been demanded.

For example, in JP-A-2002-165134, a mechanism in which a switching unit that turns on/off power supply to an output circuit and a switching control unit that supplies a control signal to the switching unit and controls the switching unit to turn off the power supply to the output circuit in a blanking period is proposed.

SUMMARY OF THE INVENTION

It is conceivable that the mechanism disclosed in JP-A-2002-165134 is applied to the CMOS-type solid-state imaging device. In this case, when analog imaging signals are output from the CMOS-type solid-state imaging device, application of the mechanism may be possible without a special problem.

However, when digital imaging data is output, the mechanism in JP-A-2002-165134 that simply turns off power supply to the output circuit in the blanking period is problematic. For example, the output circuit and the external circuit remain connected, and, if the power supply to the output circuit is stopped, the potential at the output terminal of the output circuit (i.e., the input terminal of the external circuit) may be unstable and may cause adverse effect on the input of the external circuit.

Thus, it is desirable to provide a mechanism that can suppress the adverse effect on the external circuit when the power supply to the output circuit is off.

In an embodiment of the invention, a transfer driving unit that drives a signal line from transfer based on data of a data holding circuit holding digital data, a signal amplification unit that receives the data of the data holding circuit transmitted via the signal line and performs signal amplification, a potential fixing unit that fixes an input terminal and/or internal wiring of the signal amplification unit connected to the signal line to a predetermined potential, a drive power supply unit that on/off-controls power supply to the signal amplification unit, a scan unit that controls the transfer driving unit to transfer the data via the signal line to the signal amplification unit, and a drive control unit that controls entire operation are provided.

The drive control unit controls the drive power supply unit to turn off the power supply to the signal amplification unit, and controls the potential fixing unit to fix the input terminal and/or the internal wiring of the signal amplification unit to the predetermined potential in a period of a standby state in which the data is not transferred via the signal line to the signal amplification unit.

In the mechanism, in the period of the standby state, not only the power supply to the signal amplification unit is stopped but also the input terminal or the internal wiring of the signal amplification unit is fixed to the predetermined potential. There is a possibility that the externally output data may be unstable only by stopping the power supply to the signal amplification unit, however, the problem is solved when the input terminal or the internal wiring of the signal amplification unit is fixed to the predetermined potential.

According to the embodiment of the invention, the adverse effect on the external circuit when the power supply to the output circuit is off can be suppressed compared to the case in which the invention is not applied.

BRIEF DESCRIPTION OF THE DRAWINGS

FIG. 2A is a diagram for explanation of operations before and after completion of horizontal transfer in an embodiment.

FIG. 2B shows a configuration example of a signal amplification unit.

FIG. 2C is a diagram for explanation of a data output operation in an embodiment.

FIG. 3A is a diagram for explanation of a standby timing control signal.

FIG. 3D is a diagram (I) for explanation of a data output operation in an embodiment.

FIG. 3E is a diagram (II) for explanation of the data output operation in an embodiment.

FIG. 4A shows a configuration example of a control signal generation part of an embodiment.

FIG. 4B is a diagram for explanation of a data output operation in an embodiment.

FIG. 5 shows an embodiment focused on a horizontal data transfer system.

FIG. 5B is a diagram for explanation of a data output operation in an embodiment.

DESCRIPTION OF PREFERRED EMBODIMENTS

Hereinafter, embodiments of the invention will be explained in detail with reference to the drawings.

The explanation will be made in the following order.

1. Basic Configuration of Solid-state Imaging Device
2. First Embodiment (Solid-state imaging device: basic)
3. Second Embodiment (Solid-state imaging device: standby state in horizontal blanking period)
4. Third Embodiment (Solid-state imaging device: standby state is released with horizontal period synchronization signal)
5. Fourth Embodiment (Solid-state imaging device: standby state is released with counter-latch start signal)
6. Fifth Embodiment (Application to imaging device)

As below, the case where a CMOS-type solid-state imaging device as an example of an X-Y addressed solid-state imaging device is used will be explained as an example. Unless otherwise noted, the CMOS-type solid-state imaging device will be explained to have unit pixels all including nMOS (n-channel MOS transistors) and negative signal charge (electrons). This is just an example, and the intended device is not limited to the MOS-type solid-state imaging device, but may have unit pixels of pMOS (p-channel MOS transistors) and positive signal charge (holes). All of the embodiments that will be described later can equally be applied to all of semiconductor devices for sensing a physical quantity distribution formed by arranging unit pixels having sensitivity to externally input electromagnetic wave such as light or radiation linearly or in a matrix and reading out signals by address control.

<Solid-State Imaging Device: Basic Configuration>

Figure 1:
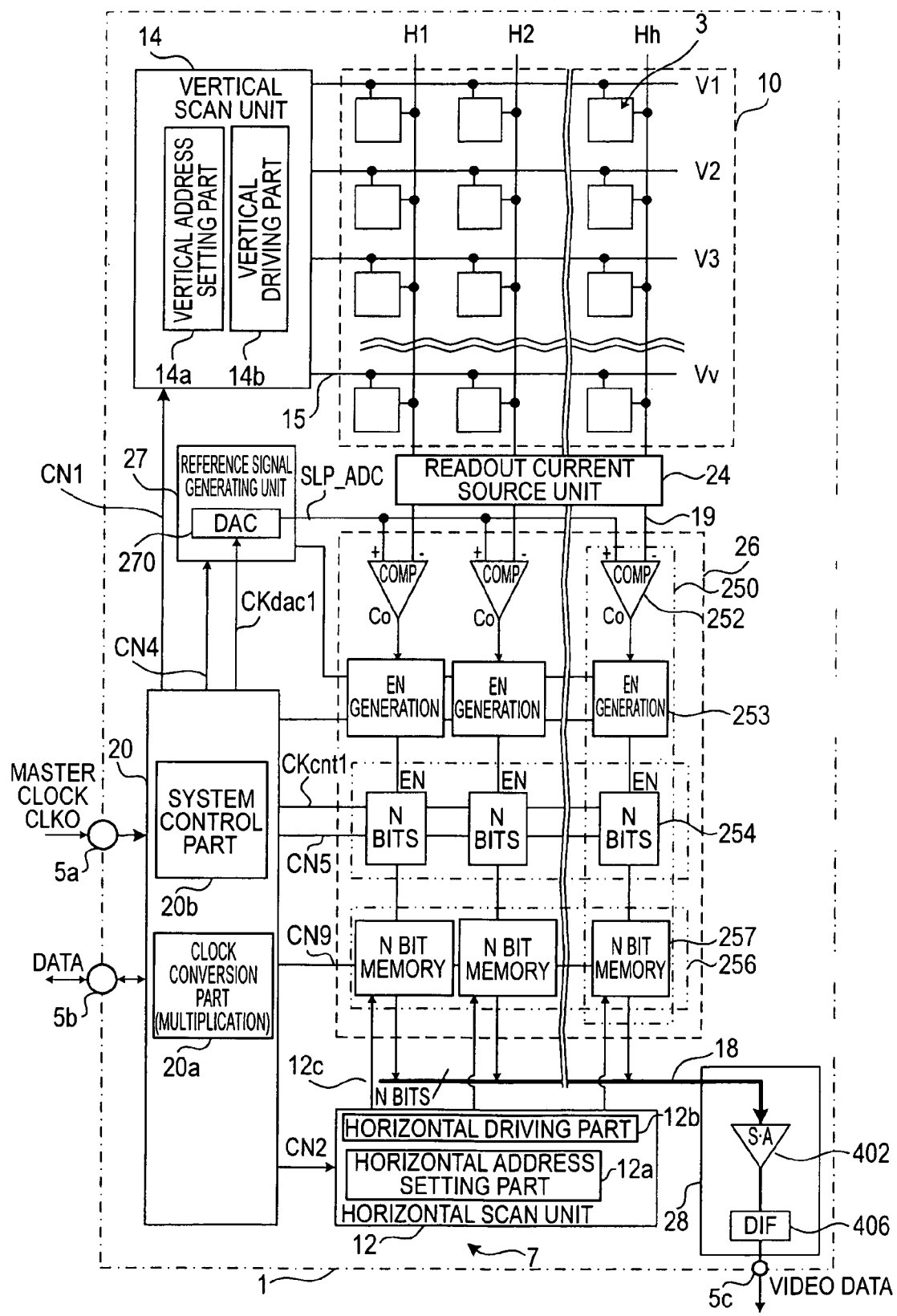
FIG. 1 is a basic configuration diagram of a CMOS-type solid-state imaging device.

FIG. 1 is a basic configuration diagram of a CMOS-type solid-state imaging device (CMOS image sensor) as one embodiment of the solid-state imaging device. The solid-state imaging device is also an example of a semiconductor device.

The solid-state imaging device 1 has a pixel array unit 10 in which plural unit pixels 3 are arranged in a two-dimensional matrix. In FIG. 1, parts of rows and columns are omitted for simplification, but actually, several tens to several thousands of unit pixels 3 are provided in the respective rows and columns. From the unit pixels 3, pixel signal voltages Vx are output via vertical signal lines 19 with respect to each column.

In the pixel signal voltage Vx of the vertical signal line 19, a signal level Ssig appears after a reset level Srst containing noise of the pixel signal as a reference level in a time sequence. The signal level Ssig is formed by adding a signal component Vsig to the reset level Srst, and the signal component Vsig is obtained by Ssig (=Srst+Vsig)−Srst.

The solid-state imaging device 1 further has a column AD conversion unit 26 in which AD conversion parts 250 having a CDS (Correlated Double Sampling) processing function and a digital conversion function are provided in column parallel.

The solid-state imaging device 1 further has a drive control unit 7, a readout current source unit 24 that supplies operating currents for reading out pixel signals (readout current) to the unit pixels 3, a reference signal generating unit 27 that supplies a reference signal for AD conversion SLP_ADC to the column AD conversion unit 26, and an output unit 28.

The drive control unit 7 includes a horizontal scan unit 12 (column scan circuit), a vertical scan unit 14 (row scan circuit), and a communication and timing control unit 20 for realization of the control circuit function for sequentially reading out the signals of the pixel array unit 10. The horizontal scan unit 12 specifies the column location of the data to be read out at data transfer operation.

The horizontal scan unit 12 has a horizontal address setting part 12a and a horizontal driving part 12b that control the column address and the column scan. The vertical scan unit 14 has a vertical address setting part 14a and a vertical driving part 14b that control the row address and the row scan. The horizontal scan unit 12 and the vertical scan unit 14 start the row and column selection operations (scanning) in response to control signals CN1 and CN2 provided from the communication and timing control unit 20.

The communication and timing control unit 20 includes a functional block of a timing generator (an example of a readout address controller) that supplies clocks in synchronization with the master clock CLK0 input via a terminal 5a to the respective units (the scan units 12, 14 and the column AD conversion unit 26) within the device. Further, the unit includes a functional block of a communication interface that receives the master clock CLK0 supplied from an external main control unit via the terminal 5a, receives data for commanding an operation mode or the like supplied from the external main control unit via a terminal 5b, and outputs data containing information of the solid-state imaging device 1 to the external main control unit.

For example, the communication and timing control unit 20 has a clock conversion part 20a having a function of a clock conversion part that generates internal clocks, and a system control part 20b having a communication function and a function of timing-controlling the respective units. The clock conversion part 20a contains a multiplication circuit that generates a pulse at a higher frequency than that of the master clock CLK0 based on the master clock CLK0 input via the terminal 5a, and generates internal clocks such as a count clock CKcnt1 and a count clock CKdac1.

The output unit 28 has a signal amplification part 402 (S•A) and a digital interface part 406 (DIF). As will be described later, the output unit 28 has another functional part to execute a power consumption reducing function at standby. The signal amplification part 402 detects signals (digital data having small amplitudes) on a horizontal signal line as a signal line for data transfer (transfer wiring).

The digital interface part 406 intervenes between the signal amplification part 402 and the external circuit and executes an interface function to the external circuit. The output of the digital interface part 406 is connected to an output terminal 5c, and video data is output to a downstream circuit.

The unit pixels 3 are respectively connected to the vertical scan unit 14 via row control lines 15 for row selection and to the AD conversion parts 250 provided with respect to each vertical column of the column AD conversion unit 26 via the vertical signal lines 19. The row control lines 15 show entire wiring entering the pixels from the vertical scan unit 14.

The vertical scan unit 14 selects a row of the pixel array unit 10, and supplies a necessary pulse to the row. The vertical address setting part 14a selects not only a row from which the signal is read out (readout row: also referred to as "selected row" or "signal output row") but also a row for electronic shutter.

As an AD conversion method in the AD conversion parts 250, various methods are considered in view of the circuit size, processing speed (higher speed), resolution, or the like. As an example, an AD conversion method also referred to as "reference signal comparison type", "slope integration type", or "ramp signal comparison type", or the like is employed. This method has a feature that, since an AD converter can be realized by a simple configuration, the circuit size is not increased even when the converters are provided in parallel. For reference signal comparison type AD conversion, a count operation enable period Ten (here, a count enable signal EN indicating the period) is determined based on a time from the start of conversion (the start of comparison processing) to the end of conversion (the end of comparison processing), and signals as a target of processing is converted into digital data based on the number of clocks in the period.

When the reference signal comparison type AD conversion is employed, it is conceivable that the reference signal generating unit 27 is provided in column parallel (with respect to each pixel column) in a way. For example, there is a configuration in which comparators and reference signal generators are provided in the respective pixel columns, values of the reference signals are sequentially changed by the corresponding reference signal generators based on comparison results of the comparators of the same columns. However, this increases the circuit size and the power consumption. On this account, in the embodiment, a configuration commonly using the reference signal generating unit 27 among all columns is employed, and the reference signal SLP_ADC generated from the reference signal generating unit 27 is commonly used by the AD conversion parts 250 of the respective pixel columns.

For the purpose, the reference signal generating unit 27 has a DA (Digital Analog) converter 270 (DAC). The DA converter 270 generates the reference signal SLP_ADC having a gradient (rate of change) shown by control data CN4 from an initial value shown by the control data CN4 from the communication and timing control unit 20 in synchronization with the count clock CKdac1. The reference signal SLP_ADC may have a waveform having a gradient as a whole and linearly changing, and the change may present a smooth slope shape, or the waveform may change in a step-like pattern.

For reference signal comparison type AD conversion, the count operation enable period Ten (here, a count enable signal EN showing the period) is determined based on a comparison result between the reference signal SLP_ADC and the pixel signal voltage Vx by a comparison part 252, and an analog signal as a target of processing is converted into digital data based on the number of clocks of the count clock CKcnt1 in the period in which the count enable signal EN is active.

Processing with respect to the reference level (reset level Srst) is referred to as "pre-charge phase" (may be abbreviated as "P-phase") processing and processing with respect to the signal level Ssig is referred to as "data phase" (may be abbreviated as "D-phase") processing. In the case where the D-phase processing is performed after P-phase processing, the D-phase processing is processing with respect to the signal level Ssig formed by adding the signal component Vsig to the reset level Srst.

The applicant proposes various reference signal comparison type AD conversion methods as to how to take the count operation enable period Ten and whether to perform differential processing (CDS processing) within the AD conversion parts 250 or not, and those methods may basically be employed in the respective embodiments, which will be described later.

In any processing example, the reference signal SLP_ADC is supplied to a voltage comparator and the analog pixel signals input via the vertical signal lines 19 are compared with the reference signal SLP_ADC. At the begging of the count operation enable period Ten, counting is started for the clock signals, and the AD conversion is performed by counting the number of clocks in the designated count operation enable period Ten.

In order to perform the reference signal comparison type AD conversion, the AD conversion part 250 includes the comparison part 252 (COMP), a count operation period control part 253 (EN generation), and a counter part 254. Preferably, the counter part 254 is an up-down counter that can switch between an up-count mode and a down-count mode. Using the up-down counter, the higher frame rate can be achieved without increasing the circuit size. In this example, further, data memory parts 256 containing latches 257 (memories) for horizontal transfer are provided at the downstream of the counter parts 254 with respect to each column.

The comparison part 252 compares the reference signal SLP_ADC generated in the reference signal generating unit 27 with the analog pixel signal voltages Vx obtained through the vertical signal lines 19 (H1, H2, . . . , Hh) from the unit pixels 3 of the selected row. The comparison part 252 inverts the comparison output Co (comparator output) when the reference signal SLP_ADC and the analog pixel signal voltage Vx are equal.

A control signal CN5 for indicating other control information as to whether the counter part 254 operates the P-phase and D-phase count processing in the down-count mode or the up-count mode, setting and resetting processing of the initial value Dini in the P-phase count processing, etc. is input from the communication and timing control unit 20 to the counter part 245 of each AD conversion part 250.

The reference signal SLP_ADC generated in the reference signal generating unit 27 is input to one input terminal (+) of the comparison part 252 in common with input terminals (+) of the other comparison parts 252, and the vertical signal lines 19 of the respectively corresponding to the vertical columns are connected to other input terminals (−) and the pixel signal voltages Vx from the pixel array unit 10 are individually input to the terminals.

The count clock CKcnt1 is input from the communication and timing control unit 20 to the clock terminal CK of the counter part 254 in common with the clock terminals CK of the other counter parts 254. In the case where the data memory parts 256 are not provided, control pulses are input from the horizontal scan unit 12 via the control lines 12*c* to the counter parts 254. The counter parts 254 have a latch function of holding count results, and holds the counter output values until instructions are provided by the control pulses via the control lines 12*c*.

The solid-state imaging device 1 of the embodiment is formed to have a so-called one-chip configuration in which the respective elements of the horizontal scan unit 12, the vertical scan unit 14, etc. of the drive control unit 7 are integrally formed together with the pixel array unit 10 in a semiconductor region of single crystal silicon using the same technology as a semiconductor integrated circuit manufacturing technology.

The solid-state imaging device 1 may have the configuration as one chip with the respective units integrally formed in the semiconductor region, or, though illustration is omitted, may have a module form having an imaging function in which not only the various signal processing units such as the pixel array unit 10, the drive control unit 7, and the column AD conversion unit 26 but also an optical system of an imaging lens, an optical low-pass filter, or an infrared light cut filter are collectively packaged.

At the output sides of the individual AD conversion parts 250, for example, the outputs of the counter parts 254 may be connected to horizontal signal lines 18. Alternatively, as shown in the drawing, a configuration in which the data memory parts 256 as memory units including latches that hold the count results held by the counter parts 254 are provided may be employed at the downstream of the counter parts 254. The data memory parts 256 hold and store the count data output from the counter parts 254 at predetermined timing.

The horizontal scan unit 12 has a function of a readout scan unit that reads out the count values held by the respective data memory parts 256 in parallel with the respective comparison parts 252 and counter parts 254 of the column AD conversion unit 26 respectively performing processing in charge. The outputs of the data memory parts 256 are connected to the horizontal signal lines 18. The horizontal signal lines 18 have signal lines of one or twice (e.g., in the case of complementary output) the bit width of the AD conversion parts 250, and connected to the output unit 28 having the signal amplification part 402 corresponding to the respective output lines. The number of horizontal transfer channels of the horizontal signal lines 18 is not limited to one, but plural channels may be provided and grouped for plural columns for data transfer. Note that, the counter parts 254, the data memory parts 256, and the horizontal signal lines 18 respectively employ configurations compliant with N bits.

First Embodiment

Figure 2:
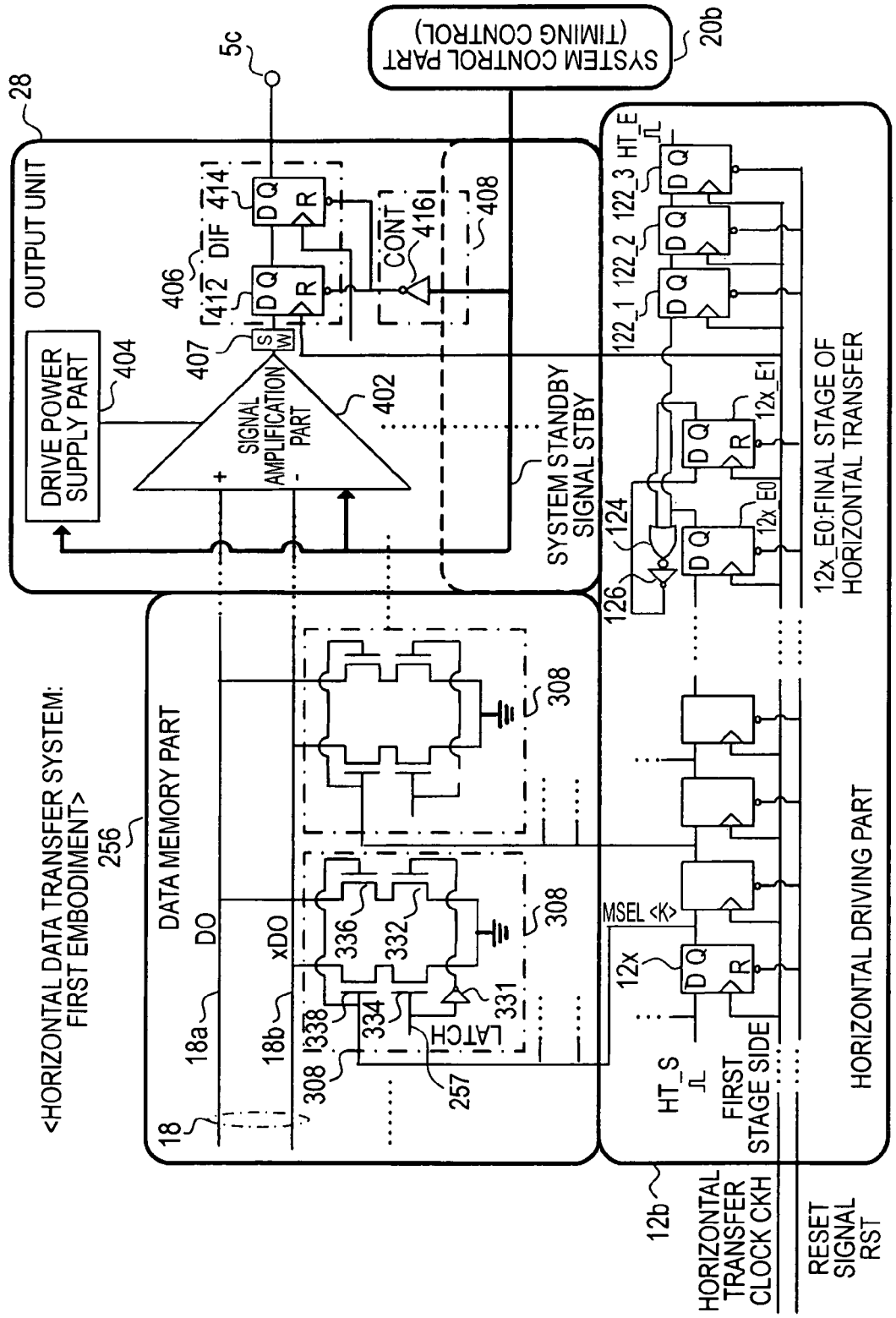
FIG. 2 shows an embodiment focused on a horizontal data transfer system.

FIGS. 2 to 2C are diagrams for explanation of the first embodiment. FIG. 2 shows the first embodiment focused on a horizontal data transfer system (configurations of the horizontal scan unit 12, (output stages) of the data memory parts 256, and the output unit 28). FIG. 2A is a diagram for explanation of operations before and after completion of horizontal transfer in the first embodiment. FIG. 2B shows a configuration example of the signal amplification unit 402. FIG. 2C is a timing chart for explanation of a data output operation in the first embodiment.

[Data Memory Part]

The data memory part 256 has a horizontal transfer driver 308 as an output stage of the latch 257 (not shown) that loads and temporarily holds data of the counter part 254 with respect to each latch 257 (each column). The horizontal transfer driver 308 as an example of a transfer driving unit that drives the horizontal signal lines 18 (18*a*, 18*b*) as signal lines for data transfer based on the data of the data memory parts 256 (latch 257) has an inverter 331, a pair of (two) transfer transistors 332, 334, and a pair of (two) selection transistors 336, 338. The inverter 331 is a CMOS inverter in which a pMOS and an nMOS are cascade-connected. All of the respective transistors 332, 334, 336, 338 are nMOS. The input terminal of the inverter 331 and the gate of the transfer transistor 334 are commonly connected to an up-down count data line, and the output of the latch 257_K of the corresponding column <K> is input thereto. Data inverted by the inverter 331 is input to the gate of the transfer transistor 332.

The respective sources of the transfer transistors 332, 334 are grounded. The drain of the transfer transistor 332 is connected to the source of the selection transistor 336, and the drain of the transfer transistor 334 is connected to the source of the selection transistor 338. The drain of the selection transistor 336 is connected to the horizontal signal line 18*a* for non-inverted data (D0), and the drain of the selection transistor 338 is connected to the horizontal signal line 18*b* for inverted data (xD0). The gates of the selection transistors 336, 338 are commonly connected and the selection control signal MSEL from the horizontal scan unit 12 is input thereto. For higher speed, the horizontal transfer employs current transfer by a pair of differential signal lines.

When the respective gates of the transfer transistor 332 and the selection transistor 336 are at H-level, the respective transistors 332, 336 are turned on and a current flows from the signal amplification part 402 within the output unit 28 to the grounded side via the horizontal signal line 18*a* for non-inverted data. Similarly, when the respective gates of the transfer transistor 334 and the selection transistor 338 are at H-level, the respective transistors 334, 338 are turned on and a current flows from the signal amplification part 402 to the grounded side via the horizontal signal line 18*b* for inverted data. For example, when the signal amplification part 402 is on the left in the drawing, the direction in which the current flows from right to left is positive.

That is, the horizontal transfer driver 308 operates to transfer the non-inverted data to the signal amplification part 402 via the horizontal signal line 18*a* when both the transfer transistor 332 and the selection transistor 336 are turned on. Further, the horizontal transfer driver 308 operates to transfer the inverted data to the signal amplification part 402 via the horizontal signal line 18*b* when both the transfer transistor 334 and the selection transistor 338 are turned on.

[Horizontal Driving Part]

The horizontal driving part 12*b* of the horizontal scan unit 12 has many DFF12*x* (DFF: delay flip-flop), and there is one DFF12*x* for each horizontal transfer driver 308. That is, the DFF12*x* is provided with respect to each column in the AD conversion parts.

A two-input OR gate 124 and an inverter 126 are provided between the DFF12*x*_E0 on the final stage and the DFF12*x*_E1 on the stage one stage after. The non-inverted output Q of the DFF12*x*_E0 and the non-inverted output Q of the DFF12*x*_E1 are respectively input to the OR gate 124, and the outputs are logically inverted by the inverter 126 and supplied to the D-input terminal of the DFF12*x*_E1. The OR gate 124 and the inverter 126 are provided for constantly keeping the non-inverted output of the DFF12*x*_E1 on the stage one stage after the final stage at H-level after the horizontal transfer is completed, and accordingly, such a circuit is referred to as termination circuit.

Further, three DFFs 122 are provided on the right of the DFF12x_E1 in the drawing as a data transfer end pulse generation circuit for generating a data transfer end pulse HT_E of active H. The non-inverted output of the DFF12x_E0 is supplied to the data input terminal D of the DFF122_1 on the first stage.

Regarding the respective DFF12x, 122, the horizontal transfer clock CKH is commonly supplied from the horizontal address setting part 12a (originally from the system control unit 20b) to the clock input terminals, the reset signal RST is commonly supplied from the horizontal address setting part 12a to the reset terminals R (circles in the drawing). The DFF12x supply the selection control signal MSEL of active H from the non-inverted output terminal Q to the gates of the selection transistors 336, 338.

FIG. 2A shows an operation example of the horizontal transfer and the data transfer end pulse generation in the first embodiment. The DFF12x, 122 are reset when the reset signal RST is an inactive L. A data transfer start pulse HT_S showing the start point of a pixel data output period Ta is input to the data input terminal D of the DFF12x on the first stage (left end). The DFF12x sequentially transfer (shift) information of the data transfer start pulses to the subsequent stage based on the horizontal transfer clock CKH. Thereby, the DFF12x of the columns corresponding to the AD conversion parts 250 sequentially turn the selection control signal MSEL to H-level as the non-inverted output Q from the first stage. Only one of the many DFF12x sequentially turns the selection control signal MSEL to H-level. Only one horizontal transfer driver 308 that has received the H-level of the selection control signal MSEL turns to the active state, and transfers the data of the counter part 254 of the corresponding column to the output unit 28.

After the horizontal transfer reaches the final stage, the non-inverted output of the DFF12x_E1 is maintained at H-level. On the other hand, in the data transfer end pulse generation circuit having the three-stage DFFs 122, the non-inverted output of the DFF12x_E0 received by the DFF 122_1 on the first stage and transferred to the DFF 122_2 on the second stage and the DFF 122_3 on the third stage, and the non-inverted output Q of the DFF 122_3 on the third stage is used as the data transfer end pulse HT_E.

In this example, the data transfer end pulse HT_E is turned to the active level (here, H) at the third clock after completion of the horizontal transfer, but this is just an example. As long as the data transfer end pulse HT_E indicates at least the end of the horizontal transfer, the timing of outputting the active level may be slightly prior or subsequent thereto.

For example, the data transfer end pulse HT_E may be turned to the active level immediately after the completion of the horizontal transfer or at the second clock, or the data transfer end pulse HT_E may be turned to the active level at the fourth or subsequent clock. Note that, in the relationships with the third and fourth embodiments described as below, the amount of data delay due to the latch (DFF) provided in the digital interface part 406 may be taken into account.

Further, in this example, the width of the active level takes one clock, and the width of the active level may take two clocks or more in a range not excessively wide. For example, a gate circuit may be added so that the width may take several clocks.

The data DATA<K> of the counter part 254 is held in a latch (not shown) of the data memory part 256, output as logically inverted (complementarily related) xDATA<K>, and input to the horizontal transfer driver 308 in a single-ended manner. The single-ended inverted xDATA<K> is input to the inverter 331 of the horizontal transfer driver 308 as DATA<K> and inverted. By the inverter 331, the data becomes complementary data (differential signal) in relation to the input of the inverter 331, and drives the horizontal transfer channels (two horizontal signal lines 18a, 18b) of the complementary (differential) method. In this case, the signal amplification part 402 reproduces the data not using the voltage amplification method but using the current difference amplification method.

When the digital data is transferred in the complementary data and reproduced by a differential amplification circuit provided in the downstream signal amplification part 402, if noise is mixed in the horizontal signal lines 18a, 18b, the influence can be cancelled. By further intervening an amplification circuit between the complementary horizontal signal lines 18a, 18b and the signal amplification part 402, making the amplitude at the horizontal signal lines 18a, 18b sides smaller and making the amplitude at the input side of the signal amplification part 402 larger, a problem due to the parasitic capacity on the horizontal signal lines 18a, 18b as bus lines can be improved. This is because the lower power consumption and the higher speed transfer operation can be realized by the transfer in information of the smaller amplitude than by the transfer in information of the larger amplitude.

Obviously, data transfer in the complementary form is not indispensable, but data transfer using only one of the horizontal signal lines 18a, 18b may be performed. When only the horizontal signal line 18a is used, the transfer transistor 334 and the selection transistor 338 may be detached from the horizontal transfer driver 308. When only the horizontal signal line 18b is used, the transfer transistor 332 and the selection transistor 336 may be detached from the horizontal transfer driver 308.

[Output Unit]

The output unit 28 has the signal amplification part 402 connected to the horizontal signal lines 18 (18a, 18b), a drive power supply part 404 that turns on/off the power supply to the signal amplification part 402, the digital interface part 406 (DIF), and a drive signal generation part 408 (CONT). A system standby signal STBY is supplied from the system control part 20b to the signal amplification part 402 and the drive power supply part 404 as a power control signal for reducing the power consumption in the output unit 28.

When the output unit 28 enters the period of the standby state, the digital interface part 406 loads and holds the data input from the signal amplification part 402 at the beginning of the period of the standby state, and externally outputs the data. This is for avoiding the instability of the potential of the output terminal 5c (i.e., the input terminal of the external circuit).

Preferably, a connection switching part 407 (SW) that switches connection of data lines may be provided between the signal amplification part 402 and the digital interface part 406. The connection switching part 407 can disconnect the parts at standby. In this case, at the beginning of the period of the standby state, the data input from the signal amplification part 402 is loaded and held in the digital interface part 406 at the beginning of the period of the standby state, and, immediately after that, the connection switching part 407 disconnects the parts. Alternatively, the data input from the signal amplification part 402 may not be loaded in the digital interface part 406 at the beginning of the period of the standby state, but output data may be set or reset.

That is, not only that the power supply to the signal amplification part 402 is stopped, but also the data externally output from the digital interface part 406 is formed to be predetermined data. The predetermined data is easily formed by resetting all bits to zero (L: low) or setting all bits to one (H: high) as typical examples. Whether to set the bits to zero or one may be selected to minimize the entire power consumption in relation to the circuit configuration. Either case is to eliminate an adverse effect due to the connection to the digital interface part 406 while power supply to the signal amplification part 402 as an analog system is stopped. In this respect, the other embodiments described are similar.

The drive power supply part 404 stops the power supply to the signal amplification part 402 when the system standby signal STBY is active. The signal amplification part 402 determines the potential of the input terminal and a specific signal line of the internal circuit at certain levels when the system standby signal STBY is active.

The digital interface part 406 has DFF 412, 414. The drive signal generation part 408 has an inverter 416. The output of the signal amplification part 402 is supplied to the D-input terminal of the DFF 412 and the non-inverted output Q of the DFF 412 is supplied to the D-input terminal of the DFF 414. The non-inverted output Q of the DFF 414 is connected to the output terminal 5c for data output.

The inverter 416 logically inverts the system standby signal STBY from the system control part 20b. Regarding the DFF 412, 414, the horizontal transfer clock CKH is commonly supplied from the horizontal driving part 12b to the respective clock input terminals, and the output of the inverter 416 is commonly supplied to the respective reset terminals R.

When the system standby signal STBY is the active H, the output of the inverter 416 turns to L-level, and the DFF 412, 414 are reset. When the system standby signal STBY is the active H and the power supply to the signal amplification part 402 is stopped, resetting of the DFF 412, 414 prevents unstable data from being externally output at the standby operation.

[Signal Amplification Part]

As shown in FIG. 2B, the signal amplification part 402 has a configuration that reproduces data according to the current difference amplification method. Specifically, the signal amplification part 402 has an inversion NMOS transistor 422, a pull-up PMOS transistor 424 as an active load of the NMOS transistor 422, and a differential amplification circuit 426 with respect to the horizontal signal line 18a. The signal amplification part 402 further has an inversion NMOS transistor 432, a pull-up PMOS transistor 434 as an active load of the NMOS transistor 432, and a differential amplification circuit 436 with respect to the horizontal signal line 18b. The signal amplification part 402 further has a differential amplification circuit 438.

The signal amplification part 402 further has NMOS transistors 442, 452, PMOS transistors 444, 454, and an inverter 458 as features of the embodiment. The transistors 442, 452, 444, 454 and the inverter 458 form a potential fixing part 440 that fixes the input terminal and/or the internal wiring of the signal amplification part 402 to a predetermined potential. Here, "fixing the input terminal and/or the internal wiring to a predetermined potential" means fixing the input terminal or the internal wiring at the potential at which the power consumption is lower in the signal amplification part 402.

The NMOS transistor 442 has a source terminal grounded and a drain terminal connected to the horizontal signal line 18a. The NMOS transistor 452 has a source terminal grounded and a drain terminal connected to the horizontal signal line 18b. The system standby signal STBY is commonly supplied to the gate terminals of the NMOS transistors 442, 452.

The PMOS transistor 444 has a source terminal supplied with a power supply Vdd and a drain terminal connected to the gate of the PMOS transistor 424. The PMOS transistor 454 has a source terminal supplied with the power supply Vdd and a drain terminal connected to the gate of the PMOS transistor 434. The system standby signal xSTBY formed by logically inverting the system standby signal STBY in the inverter 458 is commonly supplied to the gate terminals of the PMOS transistors 444, 454.

The NMOS transistor 442 turns on when the system standby signal STBY is the active H, and determines the potential of the gate terminal (horizontal signal line 18a) of the NMOS transistor 422 as the ground potential. The potential of the gate terminal of the NMOS transistor 422 is to turn on/off the NMOS transistor 442, and turns off the transistor by determining the potential as the ground potential. The PMOS transistor 444 turns on at the L-level logically inverted by the inverter 458 when the system standby signal STBY is the active H, and thereby, determines the potential of the gate terminal of the PMOS transistor 424 as the power supply potential Vdd. The potential of the gate terminal of the PMOS transistor 424 defines the load current of the NMOS transistor 442, and turns the load current to zero by determining the potential as the power supply potential Vdd.

When the system standby signal STBY is the active H, the NMOS transistor 452 determines the potential of the gate (horizontal signal line 18b) of the NMOS transistor 432 as the ground potential. That function is similar to the function of the NMOS transistor 422. The PMOS transistor 454 turns on at the L-level logically inverted by the inverter 458 when the system standby signal STBY is the active H, and thereby, determines the potential of the gate terminal of the PMOS transistor 434 as the power supply potential Vdd. The function is similar to the function of the PMOS transistor 444.

Regarding the NMOS transistors 422, 432, the respective source terminals are grounded and the respective drain terminals are connected to the drain terminals of the PMOS transistors 424, 434 and the non-inverted input terminals (+) of the differential amplification circuits 426, 436. A bias voltage Vb is supplied from the drive power supply part 404 to the inverted input terminals (−) of the differential amplification circuits 426, 436. Though not shown, regarding the differential amplification circuits 426, 438, 436, the power supply voltage Vdd is supplied from the drive power supply part 404 to the positive power supply terminals, and the reference power supply terminals are grounded.

The differential amplification circuit 438 has the inverted input terminal (−) connected to the inverted output terminal (the circle in the drawing) of the differential amplification circuit 426 and the non-inverted input terminal (+) connected to the inverted output terminal (the circle in the drawing) of the differential amplification circuit 436. When the horizontal signal line 18a is at H-level and the horizontal signal line 18b is at L-level, the respective inputs to the differential amplification circuit 438 are logically inverted and the output from the differential amplification circuit 438 is logically inverted.

Regarding the PMOS transistors 424, 434, the power supply voltage Vdd is supplied from the drive power supply part 404 to the source terminals, and the gate terminals are connected to the output terminals of the differential amplification circuits 426, 436, and the transistors are driven using the outputs of the differential amplification circuits 426, 436. The differential amplification circuits 426, 436 are gate-grounded amplifiers, and have configurations in which the gate-grounded amplifiers (differential amplification circuits 426 (436)) are connected to the input of feedback loop circuits including the NMOS transistors 422 (432) and the PMOS transistors 424 (434). Virtually, the differential amplification circuits 426, 436 control the on/off levels of the PMOS transistors 424, 434. There is an advantage that a functional part that generates a control pulse for separate excitation is unnecessary because of switch control by self-excitation.

When the NMOS transistors 422 (432) are on, in order not to turn their drains to completely low level, the NMOS transistors 442 (452) are suspended on the gates of the NMOS transistors 422 (432). The NMOS transistors 442 (452) adjust the amounts of currents flowing into the drains of the NMOS transistors 422 (432) and the amounts of current flowing in the horizontal signal lines 18a, 18b, and the differential amplification circuit 438 serves as a current transfer amplifier that compares the difference between the amounts of current flowing in the horizontal signal lines 18a, 18b and outputs.

[Data Output Operation Example]

FIG. 2C shows a data output operation example in the first embodiment. Here, a relationship chart of an output period of count data for one row and output data is shown.

The system control part 20b sets the system standby signal STBY to the active H when the operation of the solid-state imaging device 1 is unnecessary. When the system standby signal STBY becomes the active H, basically, the drive power supply part 404 stops power supply to the signal amplification part 402. Accordingly, wasted power consumption can be suppressed in the signal amplification part 402. The drive power supply part 404 can be driven with low power consumption, and power supply noise and heat generation can be reduced.

When the system standby signal STBY is the active H, even if the drive power supply part 404 does not stop the power supply to the signal amplification part 402, the respective transistors 442, 452, 444, 454 are turned on and the signal amplification operation in the signal amplification part 402 is stopped. Even in the condition that the power supply to the signal amplification part 402 is continued, unwanted current consumption can be reduced by stopping the signal amplification operation of the signal amplification part 402.

Further, since the signal amplification part 402 uses the current difference amplification method, it may be possible that the part is affected by a momentary current when the power supply from the drive power supply part 404 is turned off. However, when the system standby signal STBY becomes the active H and the power supply to the signal amplification part 402 is stopped, also the respective transistors 442, 452, 444, 454 are turned on. There is an advantage that the part is hardly affected by the momentary current generated at the standby operation.

In this example, both the horizontal signal lines 18a, 18b as the input terminals of the signal amplification part 402 and the gate wiring of the PMOS transistors 424, 434 as the internal wiring are fixed to the predetermined potentials by the potential fixing part 440, however, the potential of only one of the input terminals and the internal wiring may be fixed. Obviously, the higher effectiveness is obtained in the case where both of them are fixed.

However, in this example, the drive power supply part 404 remains to continue the power supply to the signal amplification part 402 even in the horizontal blanking period HBLK before and after the pixel data output period Ta in which external output of pixel data is not necessary. In the horizontal blanking period HBLK, though external output of pixel data is not necessary, the power supply to the signal amplification part 402 remains on. As a result, unwanted current consumption is generated. Measures for that will be taken in the other embodiments described as below.

Second Embodiment

Figure 3:
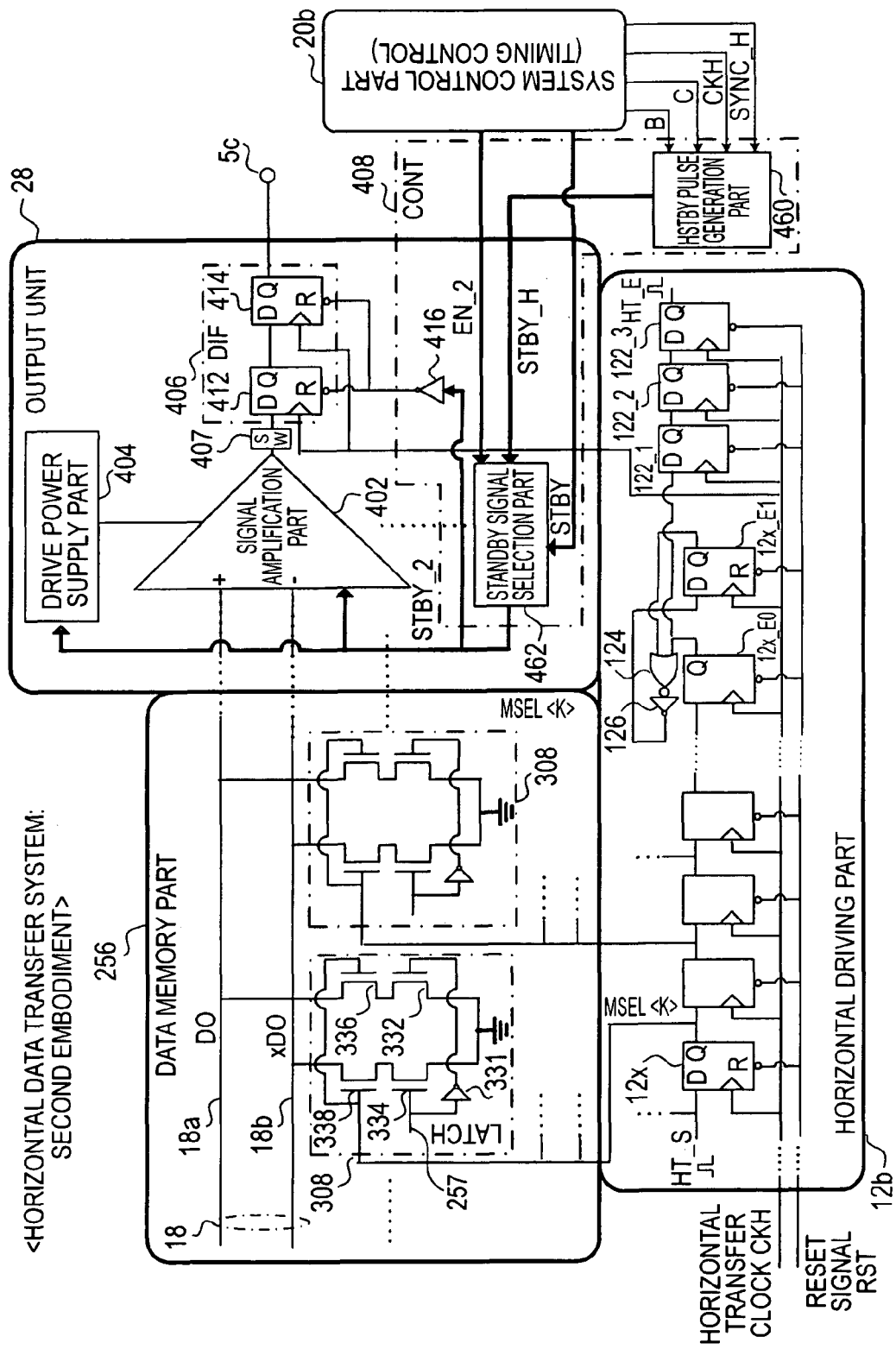
FIG. 3 shows an embodiment focused on a horizontal data transfer system.
Figure 3B:
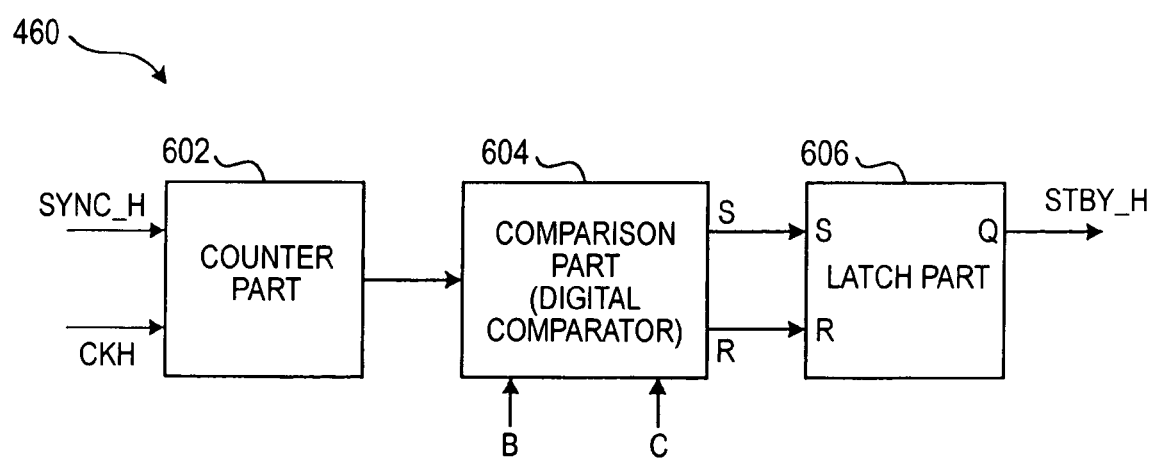
FIG. 3B is a diagram for explanation of a configuration example of a functional part that generates a horizontal blanking period standby pulse in an embodiment.
Figure 3C:
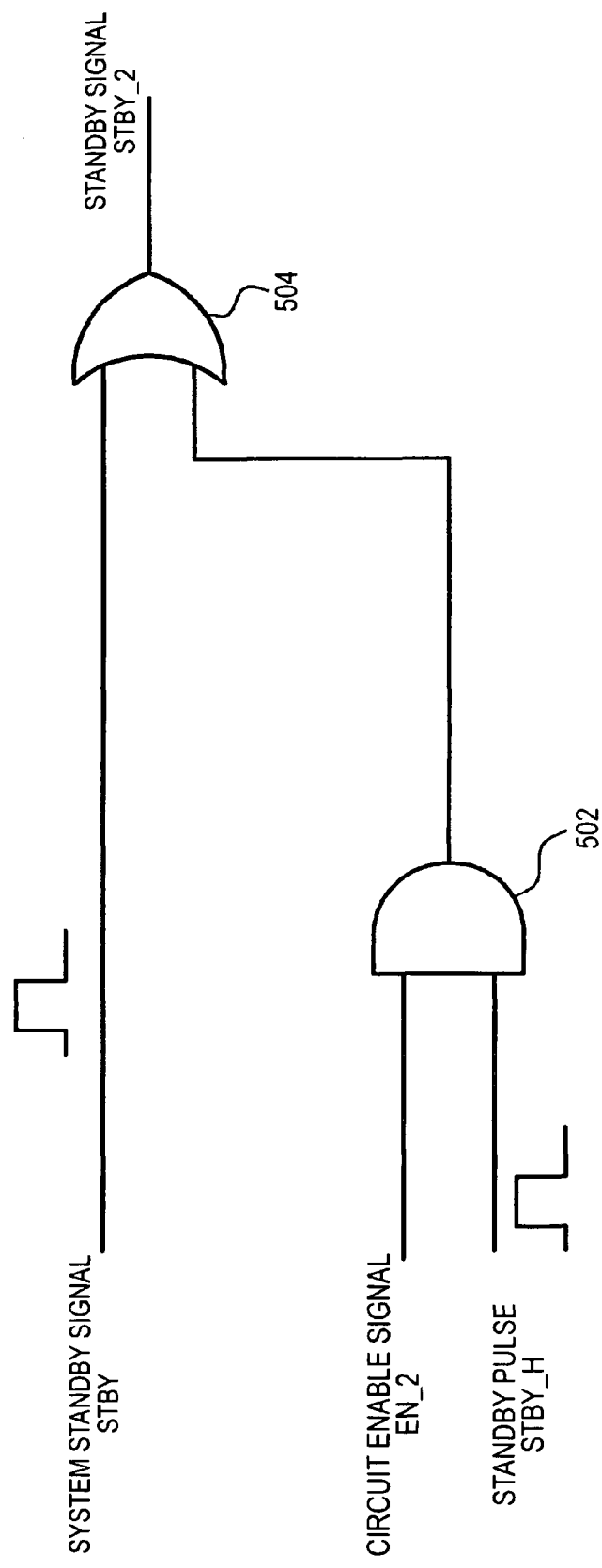
FIG. 3C shows a configuration example of a control signal generation part of an embodiment.

FIGS. 3 to 3E are diagrams for explanation of the second embodiment. FIG. 3 shows the second embodiment focused on a horizontal data transfer system. FIG. 3A is a diagram for explanation of a standby timing control signal. FIG. 3B is a diagram for explanation of a configuration example of a functional part that generates a horizontal blanking period standby pulse in the second embodiment. FIG. 3C shows a configuration example of a control signal generation part 408 of the second embodiment. FIGS. 3D and 3E are timing charts for explanation of a data output operation in the second embodiment.

In the second embodiment, in the horizontal blanking period HBLK after the pixel data output period Ta, the power supply of the drive power supply part 404 to the signal amplification part 402 is turned to non-operating condition, and the operation of the signal amplification part 402 is stopped. Unwanted current consumption in the horizontal blanking period HBLK can be reduced.

The system standby signal STBY is a signal controlled only by operation/non-operation of the entire system circuit, i.e., timing of on/off of the system power supply, and does not recognize the operation of the horizontal scan unit 12. Therefore, it may be impossible to perform the timing control of turning the system standby signal STBY to L/H when the external output of data, i.e., the horizontal transfer operation of the horizontal scan unit 12 starts/ends in the system control part 20b.

To address the situation, the drive signal generation part 408 of the second embodiment includes an HSTBY pulse generation part 460 (horizontal blanking period standby pulse generation part) and a standby signal selection part 462. They employ a circuit configuration of generating a signal for stopping the operation of the signal amplification part 402 at the time of normal standby (when the system standby signal STBY is at H-level) and in the horizontal blanking period HBLK.

A horizontal synchronization signal SYNCH, a horizontal transfer clock CKH, and discrimination data B, C having a relationship shown in FIG. 3A are supplied as the standby timing control signal from the system control part 20b to the HSTBY pulse generation part 460. The HSTBY pulse generation part 460 generates a standby pulse STBY_H (horizontal blanking period standby pulse) based on the horizontal synchronization signal SYNC_H, the horizontal transfer clock CKH, and the discrimination data B, C, and supplies the signal to the standby signal selection part 462.

The system standby signal STBY and also a circuit enable signal EN_2 are supplied from the system control part 20b to the standby signal selection part 462. That is, in the second embodiment, as power control signals for reducing the power consumption in the output unit 28, the horizontal synchronization signal SYNC_H, the horizontal transfer clock CKH, the discrimination data B, C, the system standby signal STBY, and the circuit enable signal EN_2 are used.

The system standby signal STBY to the signal amplification part 402, the drive power supply part 404, and the inverter 416 shown in the first embodiment (FIG. 2) is altered to a system standby signal STBY_2 selected by the standby signal selection part 462.

The HSTBY pulse generation part 460 has a counter part 602, a comparison part 604, and a latch part 606 as shown in FIG. 3B. The horizontal synchronization signal SYNCH and the horizontal transfer clock CKH are supplied to the counter part 602. The counter part 602 counts the horizontal transfer clock CKH using the horizontal synchronization signal SYNCH as a trigger and passes a count result (count data) to the comparison part 604. In this example, the counter part 602 counts the horizontal transfer clock CKH in a period in which the horizontal synchronization signal SYNCH is at H-level.

The comparison part 604 is a so-called digital comparator, and compares the count results by the counter part 602 with the discrimination data B, C, and outputs a pulse (active H) at the time when the count result and the discrimination data B are equal and at the time when the count result and the discrimination data C are equal. A data value that defines the time when data output is started from the digital interface part 406 (the time when the horizontal blanking period ends) is the discrimination data B, and a data value that defines the time when data output is stopped (the time when the horizontal blanking period starts) is the discrimination data C. Accordingly, the comparison part 604 turns the reset pulse R to H-level at the time when the number of horizontal transfer clocks after the horizontal synchronization signal SYNC_H turns to H-level indicates the end of the horizontal blanking period ends, and turns the set pulse S to H-level at the time when the horizontal blanking period starts.

For the latch part 606, an RS latch is used as an example. The latch part 606 turns the non-inverted output Q to H-level when the set pulse S from the comparison part 604 turns to H-level, and turns the non-inverted output Q to L-level when the reset pulse R from the comparison part 604 turns to H-level. The HSTBY pulse generation part 460 supplies the non-inverted output Q of the comparison part 604 as the standby pulse STBY_H to the standby signal selection part 462.

The standby signal selection part 462 has a two-input AND gate 502 and a two-input OR gate 504 as shown in FIG. 3C. Regarding the AND gate 502, the standby pulse STBY_H generated in the HSTBY pulse generation part 460 is supplied to one input terminal and the circuit enable signal EN_2 from the system control part 20*b* is supplied to the other input terminal. Regarding the OR gate 504, the output signal of the AND gate 502 is supplied to one input terminal, and the system standby signal STBY from the system control part 20*b* is supplied to the other input terminal and its output is used as the standby pulse STBY_2.

[Data Output Operation Example]

The standby signal selection part 462 operates as shown in FIGS. 3D and 3E based on the system standby signal STBY, the circuit enable signal EN_2, and the standby pulse STBY_H. FIG. 3D shows the situation in which the circuit enable signal EN_2 is an inactive L, and FIG. 3E shows the situation in which the circuit enable signal EN_2 is an active H. As seen from FIG. 3E, the standby pulse STBY_H is a signal at L-level in the pixel data output period Ta and at H-level in the horizontal blanking period HBLK, and stops the operation of the signal amplification part 402 at H-level. The effectiveness in reduction of unwanted current consumption is higher than that in the first embodiment.

When the standby pulse STBY_2 becomes the active H and the power supply to the signal amplification part 402 is stopped, also the respective transistors 442, 452, 444, 454 are turned on. There is an advantage that the part is hardly affected by the momentary current generated at the standby operation. In this regard, the embodiment is similar to the first embodiment.

Note that, in such a mechanism of the second embodiment, it is necessary to separately provide the HSTBY pulse generation part 460 and the standby signal selection part 462 compared to the first embodiment. Further, as current sensor specifications, the segment extraction in the number of effective pixels or pixel addition operation may be performed for the operation specifications with variable readout frame rates. Accordingly, it is necessary to perform the standby control of the horizontal scan unit 12 at each time when the number of pixels output in response to each frame rate increases or decreases, and there is a difficulty that the size of the logic circuit that controls the standby operation further increases.

In the third and fourth embodiments described as below, measures for this will be taken. Especially, the measures are characterized by simplifying the configuration of the HSTBY pulse generation part 460.

Third Embodiment

Figure 4:
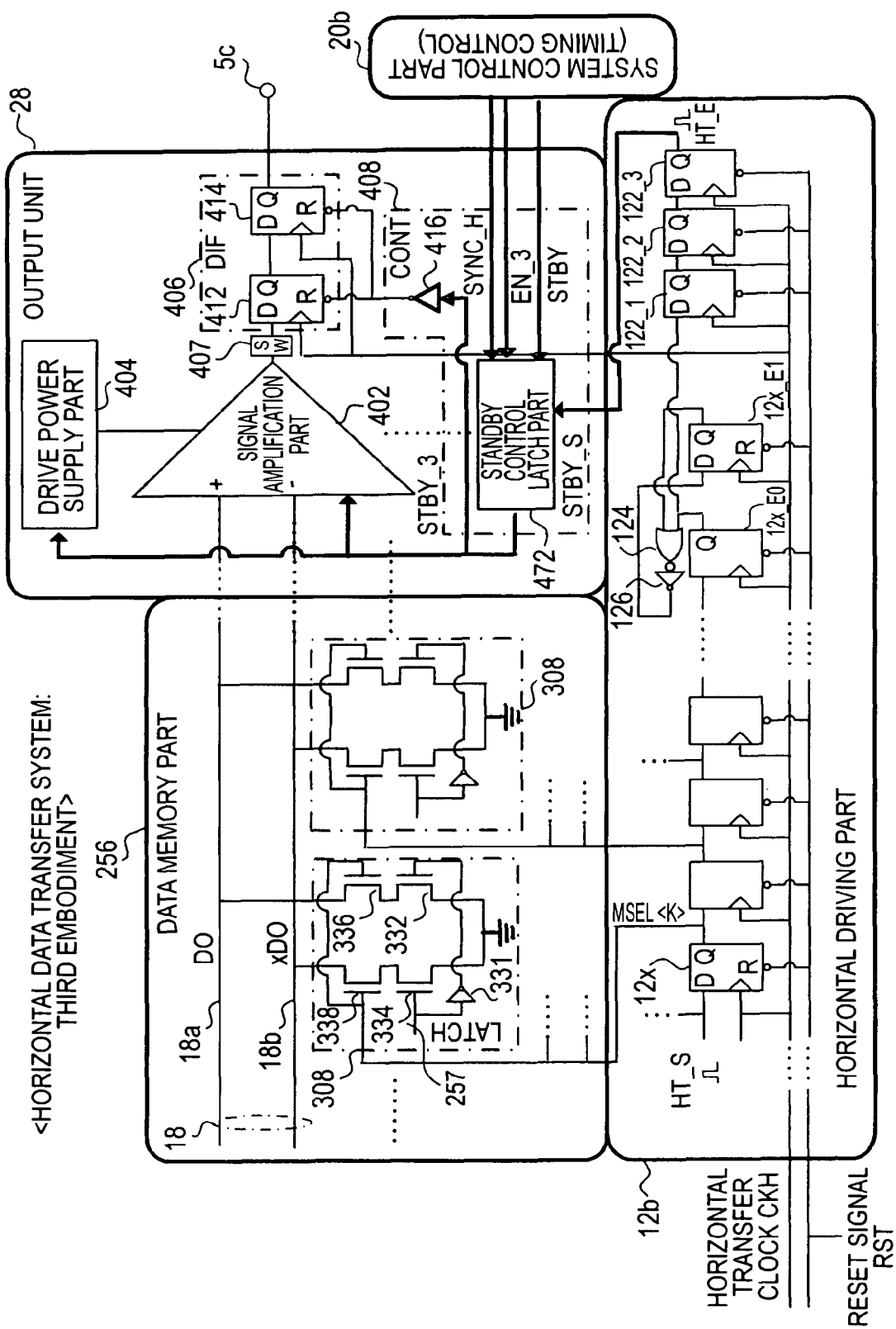
FIG. 4 shows an embodiment focused on a horizontal data transfer system.

FIGS. 4 to 4B are diagrams for explanation of the third embodiment. FIG. 4 shows the third embodiment focused on a horizontal data transfer system. FIG. 4A shows a configuration example of a control signal generation part 408 of the third embodiment. FIG. 4B is a timing chart for explanation of a data output operation in the third embodiment.

The control signal generation part 408 of the third embodiment further includes a standby control latch part 472 using the control signal generation part 408 of the first embodiment as a base. The configuration is formed by detaching the HSTBY pulse generation part 460 of the second embodiment and replacing the standby signal selection part 462 by the standby control latch part 472.

A data transfer end pulse HT_E output from the non-inverted output Q of the DFF 122_3 of the horizontal driving part 12*b* is supplied as a standby start pulse STBY_S to the standby control latch part 472. Further, the system standby signal STBY of active H, a circuit enable signal EN_3, and a horizontal synchronization signal SYNC_H of active L are supplied from the system control part 20*b* to the standby control latch part 472.

The standby control latch part 472 generates a standby signal STBY_3 based on these four signals. The standby control latch part 472 generates a standby pulse STBY_H (horizontal blanking period standby pulse) as an internal signal. That is, in the third embodiment, as power control signals for reducing the power consumption in the output unit 28, the standby start pulse STBY_S, the system standby signal STBY, the circuit enable signal EN_3, and the horizontal synchronization signal SYNC_H are used.

The system standby signal STBY to the signal amplification part 402, the drive power supply part 404, and the inverter 416 shown in the first embodiment (FIG. 2) is altered to a system standby signal STBY_3 generated by the standby control latch part 472.

The standby control latch part 472 reduces the unwanted current consumption by stopping the power supply to the signal amplification part 402 (to the standby state) in the horizontal blanking period HBLK after transfer of all pixel data has been finished. For the purpose, the digital interface part 406 of the third embodiment employs a circuit architecture that turns the power supply to the signal amplification part 402 to the standby state in the horizontal blanking period HBLK.

The standby control latch part 472 has typical inverters 510, 512, 522, 526, a two-input NOR gate 514, two-input NAND gates 516, 518, 524, and a two-input OR gate 528 as shown in FIG. 4A. It is preferable that a delay adjustment part 530 is provided at the upstream of the inverter 512. "Typical" inverter refers to a CMOS inverter in which a pMOS and an nMOS are cascade-connected like the above described inverter 331. The NAND gate 524 and the inverter 526 may be collectively changed to an AND gate.

The circuit parts of the inverters 510, 512, 522, the NOR gate 514, and the NAND gates 516, 518 correspond to the HSTBY pulse generation part 460, and the circuit parts of the NAND gate 524, the OR gate 528, and the inverter 526 correspond to the standby signal selection part 462.

The horizontal synchronization signal SYNC_H from the system control part 20b is supplied to the inverter 510. The standby start signal STBY_S is supplied to the inverter 512. Regarding the NOR gate 514, the system standby signal STBY from the system control part 20b is supplied to one input terminal, and the horizontal synchronization signal SYNC_H is logically inverted by the inverter 510 and then, supplied to the other input terminal.

The delay adjustment part 530 adjusts an amount of delay of the data transfer end pulse HT_E (standby start pulse STBY_S) from a relationship between the times when the data transfer end pulse HT_E and the output of the data latched to the DFF 12x_E1 are completed.

The inputs and outputs of the NAND gates 516, 518 are cross-coupled and connected, and the gates form an RS latch circuit as an example of a holding part that loads and holds the data transfer end pulse HT_E (standby start pulse STBY_S). Specifically, regarding the NAND gate 516, a system standby signal xSTBY logically inverted by the inverter 512 is supplied to one input terminal, and the output signal of the NAND gate 518 is input to the other input terminal. Regarding the NAND gate 518, the output signal of the NOR gate 514 is input to one input terminal, and the output signal of the NAND gate 516 is input to the other input terminal. The inverter 522 logically inverts the output signal of the NAND gate 518, and its output is used as the standby pulse STBY_H. Since the RS latch circuit is indefinite in the initial condition, the NOR gate 514 is provided and the condition is determined by the system standby signal STBY having a strongest compelling force.

Regarding the NAND gate 524, the circuit enable signal EN_3 is supplied to one input terminal, and the output signal of the inverter 522 is supplied to the other input terminal. The inverter 526 logically inverts the output signal of the NAND gate 524. Regarding the OR gate 528, the system standby signal STBY from the system control part 20b is supplied to one input terminal, and the output signal of the inverter 526 is supplied to the other input terminal, and its output is used as the standby signal STBY_3.

The standby pulse STBY_H is reset (L) at L of the horizontal synchronization signal SYNC_H, and sets (H) at H of the standby start pulse STBY_S. The circuit enable signal EN_3 enables the standby pulse STBY_H in the standby signal STBY_3, and, when the system standby signal STBY is at L-level and the circuit enable signal EN_3 is at H-level, the standby signal STBY_3 is at the same logic level as that of the standby pulse STBY_H.

[Data Output Operation Example]

The standby control latch part 472 operates as shown in FIG. 4B based on the standby start pulse STBY_S, the horizontal synchronization signal SYNC_H, the circuit enable signal EN_3, and the system standby signal STBY.

As seen from FIG. 4B, after transfer of all pixel data is finished by the horizontal scan unit 12, the horizontal scan operation transfer end signal (standby start pulse STBY_S) is supplied to the standby control latch part 472. The standby control latch part 472 receives the horizontal synchronization signal SYNC_H supplied from the system control part 20b, and automatically generates a signal for turning the signal amplification part 402 to the standby state after the horizontal blanking period HBLK is started.

When the horizontal synchronization signal SYNC_H rises, the standby pulse STBY_H (standby signal STBY_3) first turns to L-level in its L-period. Then, when the standby start pulse STBY_S turns to H-level, the standby pulse STBY_H (standby signal STBY_3) also turns to H-level.

The standby pulse STBY_H is at L after turning to L when the horizontal synchronization signal SYNC_H falls and before turning to H when the standby start pulse STBY_S turns to H-level and at H in other times in one horizontal scan period.

In this example, the data transfer end pulse HT_E turning to active H for one clock at the third clock after completion of the horizontal transfer itself is used as the standby start pulse STBY_S, but this is just an example. In consideration of the timing when the data transfer end pulse HT_E turns to the active level after completion of horizontal transfer and the timing when the output of the data from the output unit 28 latched to the DFF 12x_E0 on the final stage is completed, the delay may be appropriately handled in the delay adjustment part 530. That is, it is preferable that the delay adjustment part 530 may avoid the situation that the DFF 412, 414 of the digital interface part 406 are reset before the data latched to the DFF 12x_E0 on the final stage is output from the output unit 28 and no latch data is output.

According to the mechanism of the third embodiment, the power supply from the drive power supply part 404 to the signal amplification part 402 is stopped in the period other than the pixel data output period. The drive power supply part 404 can be driven with the low power consumption and the power noise and the heat generation can be reduced.

Further, since the signal amplification part 402 uses the current difference amplification method, it may be possible that the part is affected by a momentary current when the power supply from the drive power supply part 404 is turned off. However, when the system standby signal STBY_3 becomes the active H and the power supply to the signal amplification part 402 is stopped, also the respective transistors 442, 452, 444, 454 are turned on. There is an advantage that the part is hardly affected by the momentary current generated at the standby operation. In this regard, the embodiment is similar to the first and second embodiments.

Furthermore, the standby control latch part 472 is added to the first embodiment, however, as understood from the comparison between FIG. 3B and FIG. 4A, unlike the second embodiment, the configuration of the part corresponding to the HSTBY pulse generation part 460 is simple. Since the standby operation is completed by the architecture within the output unit 28, the size of the logic circuit is smaller than in the second embodiment. Since the circuit configuration of the part corresponding to the HSTBY pulse generation part 460 is simpler than in the second embodiment, an advantage of man-hour improvement in circuit design is obtained.

Especially, in the third embodiment, by combining the horizontal scan operation transfer end signal (standby start pulse STBY_S) existing in the circuit in related art (horizontal scan unit 12) and the horizontal synchronization signal SYNC_H, the standby pulse STBY_H that provides the standby state only in the horizontal blanking period HBLK is generated.

Accordingly, not only the normal all-pixel read driving, but regardless of the specifications in which the frame rates change according to the mode such as the mode of segment extraction in the number of pixels and the mode of pixel addition, the signal amplification part 402 can be turned to the standby state in response to the horizontal transfer operation/ non-operation. As a result, the circuit configuration for generating the standby pulse STBY_H may be simpler than the digital interface part 406 in the second embodiment, and may contribute to the reduction in size of the logic circuit and the reduction in design man-hours.

Further, in the third embodiment, as shown in FIG. 4B, the standby pulse STBY_H is turned to H-level when the horizontal blanking period HBLK begins, and the standby state is released by turning the pulse to L-level when the horizontal synchronization signal SYNC_H falls. Accordingly, in comparison with the second embodiment, the output circuit operation period Tc is not equal to the pixel data output period Ta, and the effectiveness of the reduced power consumption is less than that in the second embodiment. However, there are advantages that the recovery time from the standby state can be easily secured and the risk that the signal amplification part 402 does not drive at horizontal scan is avoidable.

Fourth Embodiment

Figure 5A:
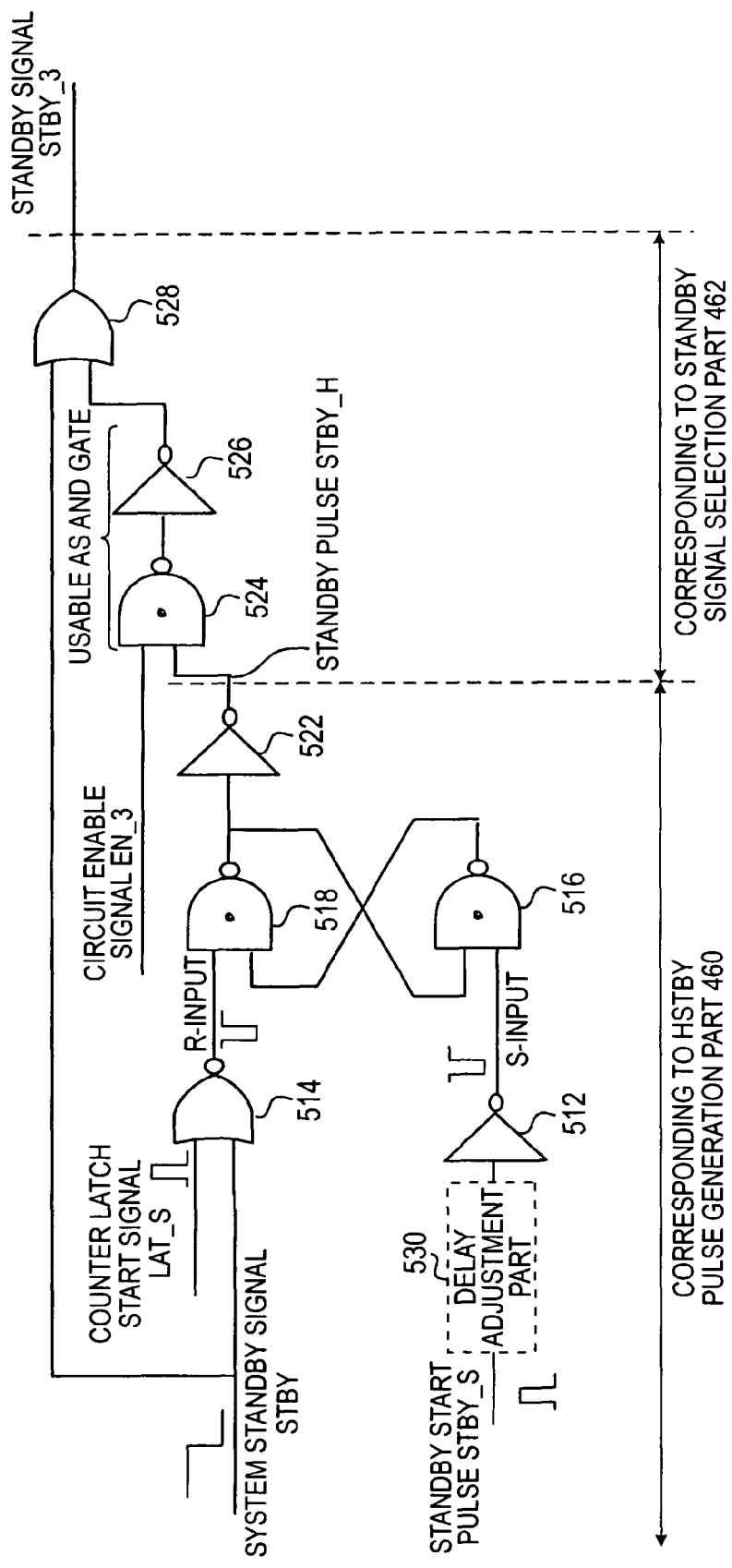
FIG. 5A shows a configuration example of a control signal generation part of an embodiment.

FIGS. 5 to 5B are diagrams for explanation of the fourth embodiment. FIG. 5 shows the fourth embodiment focused on a horizontal data transfer system. FIG. 5A shows a configuration example of a control signal generation part 408 of the fourth embodiment. FIG. 5B is a timing chart for explanation of a data output operation in the fourth embodiment.

The horizontal synchronization signal SYNC_H is used as the control signal for releasing the standby state, however, as long as the recovery time from the standby status can be secured, another signal may be used as the control signal for releasing the standby state. According to the concept in this case, when the timing at which the standby state can be released is the same as that in the case of using the horizontal synchronization signal SYNC_H, the obtained effect is the same as that in the third embodiment. On the other hand, when the control signal is a signal that can release the standby state later than in the case of using the horizontal synchronization signal SYNC_H, the effectiveness of power consumption can be made higher than in the third embodiment.

The fourth embodiment is created from the standpoint, and a counter latch start signal LAT_S as the control signal for releasing the standby state. The counter latch start signal LAT_S is an example of a hold timing signal that defines the timing when the latch 257 holds the digital data converted by the AD conversion part 250. Further, the counter latch start signal LAT_S corresponds to the signal that can release the standby state later than in the case of using the horizontal synchronization signal SYNC_H.

The control signal generation part 408 of the fourth embodiment further includes a standby control latch part 482 using the control signal generation part 408 of the first embodiment as a base. The configuration is formed by detaching the HSTBY pulse generation part 460 of the second embodiment and replacing the standby signal selection part 462 by the standby control latch part 482. In other words, the standby control latch part 472 of the third embodiment is replaced by the standby control latch part 482.

The latch 257 is provided on the up-down count data line between the counter part 254 and the horizontal transfer driver 308, and the latch 257 is controlled by the counter latch start signal LAT_S. The latch 257 has two clocked inverters 492, 494 and two typical inverters 496, 498. "Typical" inverter refers to a CMOS inverter in which a pMOS and an nMOS are cascade-connected like the above described inverter 331.

The outputs of the clocked inverters 492, 494 are commonly connected, and input to the inverter 496 and input to the horizontal transfer driver 308. The data DATA<K> of the counter part 254 is input to the clocked inverter 492 and the output data of the inverter 496 is input to the clocked inverter 494. The inverter 498 logically inverts the counter latch start signal LAT_S.

The counter latch start signal LAT_S (load signal) contained in the control signal CN9 from the system control part 20b is input to the non-inverted clock terminal CK of the clocked inverter 492 and the inverted clock terminal xCK of the clocked inverter 494. A counter latch start signal xLAT_S formed by logically inverting the counter latch start signal LAT_S by the inverter 498 is input to the inverted clock terminal xCK of the clocked inverter 492 and the non-inverted clock terminal CK of the clocked inverter 494. The counter latch start signals LAT_S, xLAT_S have a complementary relation.

In the clocked inverters 492, 494, when L-level is input to the non-inverted clock terminal CK and H-level is input to the inverted clock terminal xCK, the impedance of the output terminal becomes high and the terminal blocks the passing of data. On the other hand, in the clocked inverters 492, 494, when H-level is input to the non-inverted clock terminal CK and L-level is input to the inverted clock terminal xCK, the data input to the input terminal is inverted and output from the output terminal.

Accordingly, when the counter latch start signal LAT_S is at H-level, the output of the clocked inverter 494 has high impedance, and the clocked inverter 492 outputs data xDATA<K> formed by loading and logically inverting the data DATA<K> of the counter part 254. The inverter 496 that has received the output supplies the data DATA<K> formed by logically inverting the data xdata DATA<K> to the clocked inverter 494.

Then, when the counter latch start signal LAT_S turns to L-level, the output of the clocked inverter 492 is changed to have high impedance and the clocked inverter 494 outputs data xDATA<K> formed by loading and logically inverting the data DATA<K> from the inverter 496. The clocked inverter 494 and the inverter 496 perform a positive feedback operation, and thereby, the data xDATA<K> is held by the latch 257 in a period in which the counter latch start signal LAT_S is at L-level.

The data DATA<K> of the counter part 254 is loaded and logically inverted (in complementary relation) by the clocked inverter 492, held by the positive feedback operation by the clocked inverter 494 and the inverter 496, and the data xDATA<K> is supplied to the horizontal transfer driver 308.

The data transfer end pulse HT_E output from the non-inverted output Q of the DFF 122_3 of the horizontal driving part 12b is supplied as a standby start pulse STBY_S to the standby control latch part 482. Further, the system standby signal STBY, a circuit enable signal EN_3, and the counter latch start signal LAT_S are supplied from the system control part 20b to the standby control latch part 482. The standby control latch part 482 generates a standby signal STBY_4 based on these four signals. The standby control latch part 482 generates a standby pulse STBY_H (horizontal blanking period standby pulse) as an internal signal.

As shown in FIG. 5A, the standby control latch part 482 has almost the same in circuit configuration as the standby control latch part 472 of the third embodiment shown in FIG. 4A. The difference is that the horizontal synchronization signal SYNC_H is altered to the counter latch start signal LAT_S and the logic levels are opposite to each other, and the inverter 510 is detached in the fourth embodiment. The horizontal synchronization signal SYNC_H is reset (L) when the counter latch start signal LAT_S is at H, and set (H) when the standby start pulse STBY_S is at H. That is, in the fourth embodiment, as power control signals for reducing the power consumption in the output unit 28, the standby start pulse STBY_S, the system standby signal STBY, the circuit enable signal EN_3, and the counter latch start signal LAT_S are used.

[Data Output Operation Example]

The standby control latch part 482 performs an operation as shown in FIG. 5B and generates the standby pulse STBY_H and the circuit enable signal EN_4 based on the standby start pulse STBY_S, the counter latch start signal LAT_S, the circuit enable signal EN_3, and the system standby signal STBY. The operation may be considered as an operation in which only the horizontal synchronization signal SYNC_H in the third embodiment is altered to the counter latch start signal LAT_S, and the detailed explanation is omitted here.

The data output chart and the standby start pulse STBY_S are as shown in FIG. 5B, and the effectiveness of the power consumption reduction can be made higher than in the third embodiment by holding the standby state until immediately before the recovery time (immediately before the start of the pixel data output period Ta) as in the output circuit operation period Tc in the drawing. Accordingly, both securement of the recovery time from the standby state and reduction of power consumption can be realized.

Here, the counter latch start signal LAT_S is used in place of the horizontal synchronization signal SYNC_H, however, another signal that can release the standby state later than in the case of using the horizontal synchronization signal SYNC_H may be used. In this case, the same effect as in the fourth embodiment can be obtained.

As explained above, in the mechanism of the embodiment, the reduction effect of power consumption can be obtained because the signal amplification part 402 is turned to the standby state in the horizontal blanking period HBLK. Further, in the third and fourth embodiments, the standby pulse STBY_H can be automatically generated without preparing the HSTBY pulse generation part 460, and the circuit size can be reduced and the design man-hours can be reduced.

Furthermore, in the third and fourth embodiments, since the standby control can be performed regardless of product specifications of the frame rate length and the output bit number, the technology can also be used for a solid-state imaging device including a column ADC and the design man-hours can be reduced.

More over, as in the third embodiment, the recovery time from the standby state can be easily secured by releasing the standby state using the horizontal synchronization signal SYNC_H generated by the system control part 20b. Further, as in the fourth embodiment, by releasing the standby state using the counter latch start signal LAT_S in place of the horizontal synchronization signal SYNC_H, higher effectiveness of the power consumption reduction can be obtained while the recovery time from the standby state is secured.

Imaging Device

Fifth Embodiment

Figure 6:
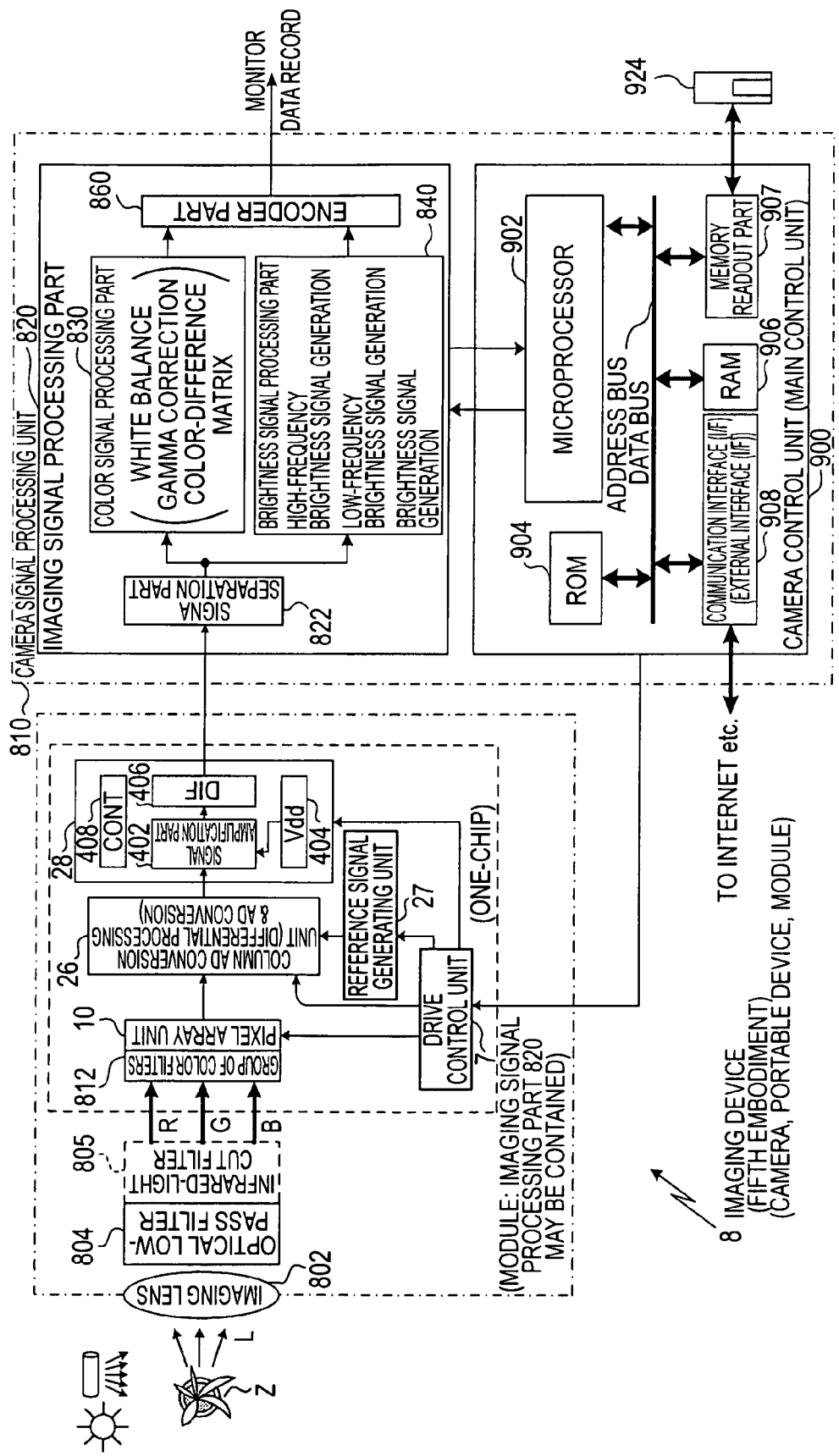
FIG. 6 is a diagram for explanation of an imaging device of an embodiment.

FIG. 6 is a diagram for explanation of an imaging device of the fifth embodiment. The fifth embodiment is formed by applying the mechanism of the output unit 28 employed in the above described respective embodiments of the solid-state imaging device 1 to an imaging device as an example of a physical information acquiring device. FIG. 6 is a schematic configuration diagram of an imaging device 8. The explanation of the main component elements is as follows (the explanation of the elements other than the main elements will be omitted).

The imaging device 8 includes an imaging lens 802, an optical low-pass filter 804, a group of color filters 812, the pixel array unit 10, the drive control unit 7, the column AD conversion unit 26, the reference signal generating unit 27, and a camera signal processing unit 810. As shown by dotted lines in the drawing, an infrared-light cut filter 805 that reduces an infrared light component may be provided with the optical low-pass filter 804. The camera signal processing unit 810 provided at the downstream of the column AD conversion unit 26 has an imaging signal processing part 820, and a camera control unit 900 that functions as a main control part for controlling the entire imaging device 8. The imaging signal processing part 820 has a signal separation part 822, a color signal processing part 830, a brightness signal processing part 840, and an encoder part 860.

The camera control unit 900 of the embodiment has a microprocessor 902, a ROM (Read Only Memory) 904 as a read-only storage part, a RAM 906 (Random Access Memory), and other peripheral members (not shown). The microprocessor 902 is equal to one that constitutes an electronic computer represented by a CPU (Central Processing Unit) in which functions of operation and control performed by a computer are integrated in a micro integrated circuit. The RAM 906 is an example of a volatile storage part readable and writable as the need arises. The microprocessor 902, the ROM 904, and the RAM 906 may be collectively referred to as "microcomputer".

The camera control unit 900 controls the entire system, and has function of switching L/H of the respective power control signals explained in the first to fourth embodiments for reducing the power consumption in the output unit 28. In practice, the switching is performed via the system control part 20b of the communication and timing control unit 20. In the ROM 904, control programs of the camera control unit 900 are stored, and specifically, in the example, programs for controlling the operation of reducing the power consumption in the output unit 28 using the camera control unit 900 are stored. In the RAM 906, data for the camera control unit 900 to perform various kinds of processing etc. are stored.

The camera control unit 900 is formed so that a recording medium 924 such as a memory card can be inserted and ejected and connection to a communication network such as the Internet can be made. For example, the camera control unit 900 includes a memory readout part 907 and a communication interface (I/F) 908 other than the microprocessor 902, the ROM 904, and the RAM 906.

The recording medium 924 is used for registration of various data of program data for allowing the microprocessor 902 to execute software processing, setting values of various control information for controlling the control processing of the conversion range of photometric data based on brightness signals from the brightness signal processing part 840 and exposure to light (containing the electronic shutter control), and power consumption reducing operation in the output unit 28. The memory readout part 907 stores (installs) the data read out from the recording medium 924 in the RAM 906. The communication I/F 908 intervenes passing of the communication data with the communication network such as the Internet.

In the imaging device 8, the drive control unit 7 and the column AD conversion unit 26 are shown separately from the pixel array unit 100 in a module form, however, one-chip configuration in which these units may be integrally formed on the same semiconductor substrate as that of the pixel array unit 10. In the drawing, the imaging device 8 is shown to include the optical system of the imaging lens 802, the optical low-pass filter 804, the infrared-light cut filter 805, or the like in addition to the pixel array unit 10, the drive control unit 7, the column AD conversion unit 26, the reference signal generating unit 27, and the camera signal processing unit 810. The embodiment is suitable for the case of a module form having an imaging function in which they are collectively packaged. Such an imaging device 8 is supplied as a portable device for performing "imaging", for example, having a camera or imaging function. Note that "imaging" includes not only the shooting of images at normal shooting with a camera, but also fingerprint detection in the broad sense.

In the imaging device 8 having the configuration, the mechanism of suppressing the power consumption in the output unit 28 can be realized by switching L/H of various power control signals explained in the first to fourth embodiments. In this regard, for example, at least, in the control relating to the L/H switching of various power control signals explained in the first to fourth embodiments, command information for control can optionally be designated by data setting for the system control part 20b in the external main control part (camera control unit 900).

As described above, the embodiments of the invention have been explained, however, the technical scope of the invention is not limited to the scope of the embodiments. Various changes or modifications can be made to the embodiments without departing from the scope of the invention, and embodiments with changes or modifications may be within the technical scope of the invention.

Further, the embodiments do not limit the invention according to claims, and all of the combinations of features explained in the embodiments is not necessarily indispensable for solving means of the invention. The above described embodiments include various stages of invention and various embodiments of the invention can be extracted by appropriate combinations in the plural disclosed constituent requirements. If some of the constituent requirements are removed from all constituent requirements shown in the embodiments, the configuration with the some of the constituent requirements removed can be extracted as an embodiment of the invention.

The embodiments have been explained in application examples to the horizontal transfer system of the solid-state imaging device 1, however, the application range of the embodiments is not limited to the solid-state imaging device. The embodiments can be applied to any semiconductor device having a mechanism of sequentially transferring data to the downstream side, as long as information of latch is transferred to transfer wiring and data of the transfer wiring is externally readout in the semiconductor device. For example, the embodiments can be applied to a semiconductor memory such as an SRAM (Static RAM) and a DRAM (Dynamic RAM).

What is claimed is:

1. A solid-state imaging device comprising:
    a pixel array unit in which unit pixels are arranged in a matrix form;
    a vertical scan unit that reads out analog pixel signals from the respective unit pixels of the pixel array unit;
    an AD conversion unit provided with respect to each column for converting the analog pixel signals read out from the respective unit pixels of the pixel array unit into digital data;
    a data memory unit having a data holding circuit that holds the digital data converted by the AD conversion unit at a downstream of the AD conversion unit of each column;
    a transfer driving unit that drives a signal line for data transfer based on data of the data holding circuit;
    a signal amplification unit that receives the data of the data holding circuit transmitted via the signal line and performs signal amplification;
    a potential fixing unit that fixes an input terminal and/or internal wiring of the signal amplification unit connected to the signal line to a predetermined potential;
    a drive power supply unit that on/off-controls power supply to the signal amplification unit;
    a scan unit that controls the transfer driving unit to transfer the data via the signal line to the signal amplification unit; and
    a drive control unit that controls entire operation,
    wherein the drive control unit controls the drive power supply unit to turn off the power supply to the signal amplification unit, and controls the potential fixing unit to fix the input terminal and/or the internal wiring of the signal amplification unit to the predetermined potential in a period of standby state in which the data is not transferred via the signal line to the signal amplification unit.

2. The solid-state imaging device according to claim 1, further comprising a digital interface unit that loads the signal amplified by the signal amplification unit and passes the signal to an external digital circuit at a downstream of the signal amplification unit,
    wherein the drive control unit controls the digital interface unit to load and hold data input to the digital interface unit at beginning of the period of the standby state and externally output the data when the period of the standby state begins.

3. The solid-state imaging device according to claim 1, further comprising:
    a connection switching unit that switches connection of a data line at a downstream of the signal amplification unit; and
    a digital interface unit that passes data to an external digital circuit at a downstream of the connection switching unit,
    wherein the drive control unit controls the connection switching unit to disconnect the signal amplification unit and the digital interface unit and controls the digital interface unit to load and hold determined data and externally output the data when the period of the standby state begins.

4. The solid-state imaging device according to any one of claims 1 to 3, further comprising a control signal generating unit that generates a control signal for controlling the drive power supply unit, the potential fixing unit, and the digital interface unit in the standby period according to a command of the drive control unit,
    wherein the control signal generating unit generates the control signal for turning a period after the digital interface unit finishes externally outputting the digital data of the pixel signals for one column in the standby state.

5. The solid-state imaging device according to claim 4, wherein the control signal generating unit generates the control signal using a pulse indicating an end of scanning output from the scan unit after the data of each column is transferred via the signal line to the signal amplification unit.

6. The solid-state imaging device according to claim 4, wherein the control signal generating unit has a holding part that loads and holds the signal output from the transfer driving unit indicating a time when the output unit finishes external output of the digital data of the pixel signals for one column.

7. The solid-state imaging device according to claim 4, wherein the control signal generating unit has a holding part that loads an end signal output from the transfer driving unit indicating a time when the output unit finishes external output of the digital data of the pixel signals for one column and thereby holds information for recognition of the time of the finish of output, and sets the control signal at a level in the standby period from the time of the finish of output.

8. The solid-state imaging device according to claim 7, wherein the control signal generating unit releases the control signal from the level in the standby period a predetermined period before the output unit starts external output of the digital data of the pixel signals for one column.

9. The solid-state imaging device according to claim 8, wherein the control signal generating unit releases the control signal from the level in the standby period according to a synchronization signal showing one cycle for the output unit to externally output the digital data of the pixel signals for one column.

10. The solid-state imaging device according to claim 8, wherein the data holding circuit releases the control signal from the level in the standby period according to a hold timing signal that defines timing when the data holding circuit holds the digital data converted by the AD conversion unit.

11. An imaging device comprising:
a pixel array unit in which unit pixels are arranged in a matrix form;
a vertical scan unit that reads out analog pixel signals from the respective unit pixels of the pixel array unit;
an AD conversion unit provided with respect to each column for converting the analog pixel signals read out from the respective unit pixels of the pixel array unit into digital data;
a data memory unit having a data holding circuit that holds the digital data converted by the AD conversion unit at a downstream of the AD conversion unit of each column;
a transfer driving unit that drives a signal line for data transfer based on data of the data holding circuit;
a signal amplification unit that receives the data of the data holding circuit transmitted via the signal line and performs signal amplification;
a potential fixing unit that fixes an input terminal and/or internal wiring of the signal amplification unit connected to the signal line to a predetermined potential;
a drive power supply unit that on/off-controls power supply to the signal amplification unit;
a scan unit that controls the transfer driving unit to transfer the data via the signal line to the signal amplification unit;
a drive control unit that controls entire operation; and
a main control unit that controls the drive control unit,
wherein the drive control unit controls the drive power supply unit to turn off the power supply to the signal amplification unit, and controls the potential fixing unit to fix the input terminal and/or the internal wiring of the signal amplification unit to the predetermined potential in a period of a standby state in which the data is not transferred via the signal line to the signal amplification unit.

12. A semiconductor device comprising:
a data holding circuit that holds digital data;
a transfer driving unit that drives a signal line for data transfer based on data of the data holding circuit;
a signal amplification unit that receives the data of the data holding circuit transmitted via the signal line and performs signal amplification;
a potential fixing unit that fixes an input terminal and/or internal wiring of the signal amplification unit connected to the signal line to a predetermined potential;
a drive power supply unit that on/off-controls power supply to the signal amplification unit;
a scan unit that controls the transfer driving unit to transfer the data via the signal line to the signal amplification unit; and
a drive control unit that controls entire operation,
wherein the drive control unit controls the drive power supply unit to turn off the power supply to the signal amplification unit, and controls the potential fixing unit to fix the input terminal and/or the internal wiring of the signal amplification unit to the predetermined potential in a period of a standby state in which the data is not transferred via the signal line to the signal amplification unit.

* * * * *